(12) United States Patent
Hiramoto et al.

(10) Patent No.: US 10,002,078 B2
(45) Date of Patent: Jun. 19, 2018

(54) INFORMATION PROCESSING APPARATUS, PARALLEL COMPUTER SYSTEM, AND CONTROL METHOD FOR CONTROLLING INFORMATION PROCESSING APPARATUS

(71) Applicant: FUJITSU LIMITED, Kawasaki-shi, Kanagawa (JP)

(72) Inventors: Shinya Hiramoto, Yokohama (JP); Yuichiro Ajima, Kawasaki (JP); Tomohiro Inoue, Kawasaki (JP); Yuta Toyoda, Kawasaki (JP); Shun Ando, Yokohama (JP); Masahiro Maeda, Zama (JP)

(73) Assignee: FUJITSU LIMITED, Kawasaki (JP)

( * ) Notice: Subject to any disclaimer, the term of this patent is extended or adjusted under 35 U.S.C. 154(b) by 620 days.

(21) Appl. No.: 14/640,559

(22) Filed: Mar. 6, 2015

(65) Prior Publication Data
US 2015/0178211 A1    Jun. 25, 2015

Related U.S. Application Data

(63) Continuation of application No. PCT/JP2012/072945, filed on Sep. 7, 2012.

(51) Int. Cl.
*G06F 12/08* (2016.01)
*G06F 12/0831* (2016.01)
(Continued)

(52) U.S. Cl.
CPC ...... *G06F 12/0833* (2013.01); *G06F 12/0806* (2013.01); *G06F 13/385* (2013.01);
(Continued)

(58) Field of Classification Search
CPC .......... G06F 2212/621; G06F 12/0833; G06F 12/0806; G06F 13/385; G06F 2212/2515; G06F 2213/3808
(Continued)

(56) References Cited

U.S. PATENT DOCUMENTS

| | | | |
|---|---|---|---|
| 5,943,691 A | 8/1999 | Wallace et al. | |
| 6,708,258 B1 * | 3/2004 | Potter | G06F 13/385 710/52 |

(Continued)

FOREIGN PATENT DOCUMENTS

| | | |
|---|---|---|
| JP | 4-289935 | 10/1992 |
| JP | 9-128324 | 5/1997 |

(Continued)

OTHER PUBLICATIONS

Office Action dated Jan. 19, 2016 in corresponding Japanese Patent No. 2014-534128.
(Continued)

*Primary Examiner* — Jasmine Song
(74) *Attorney, Agent, or Firm* — Staas & Halsey LLP

(57) ABSTRACT

An information processing apparatus includes: storage devices that store data; a data generation unit that generates padding-added data by adding padding to the data, based on adjustment information included in received data; and a storage processing unit that stores the padding-added data generated by the data generation unit in the storage devices. It is possible to shorten a latency even when non-aligned data is received.

12 Claims, 23 Drawing Sheets

(51) Int. Cl.
 *G06F 12/0806* (2016.01)
 *G06F 13/38* (2006.01)
(52) U.S. Cl.
 CPC .............. *G06F 2212/2515* (2013.01); *G06F 2212/621* (2013.01); *G06F 2213/3808* (2013.01)
(58) Field of Classification Search
 USPC .......................................................... 711/143
 See application file for complete search history.

(56) References Cited

U.S. PATENT DOCUMENTS

| | | | |
|---|---|---|---|
| 2004/0019733 A1 | 1/2004 | Garinger et al. | |
| 2007/0214326 A1 | 9/2007 | Oka et al. | |
| 2008/0263307 A1 | 10/2008 | Adachi | |
| 2011/0286378 A1* | 11/2011 | Kim | H04W 4/06 370/312 |

FOREIGN PATENT DOCUMENTS

| | | |
|---|---|---|
| JP | 9-282225 | 10/1997 |
| JP | 2007-226742 | 9/2007 |
| JP | 2008-269282 | 11/2008 |

OTHER PUBLICATIONS

Extended European Search Report dated Mar. 23, 2016 in corresponding European Patent Application No. 12884205.1.
International Search Report dated Nov. 13, 2012 for corresponding International Patent Application No. PCT/JP2012/072945.

\* cited by examiner

FIG. 5

TRANSMISSION PACKET FORMAT

| PACKET TYPE | ROUTING HEADER | LOCAL NODE ADDRESS |
|---|---|---|
| MEMORY NODE ADDRESS | OFFSET | PADDING FLAG |
| ALIGNMENT SIZE | PAYLOAD | |

FIG. 8

TRANSMISSION PACKET FORMAT

| PACKET TYPE | ROUTING HEADER | LOCAL NODE ADDRESS |
|---|---|---|
| MEMORY NODE ADDRESS | OFFSET | |
| | PAYLOAD | |

INFORMATION PROCESSING APPARATUS, PARALLEL COMPUTER SYSTEM, AND CONTROL METHOD FOR CONTROLLING INFORMATION PROCESSING APPARATUS

CROSS-REFERENCE TO RELATED APPLICATION

This application is a continuation application of International Application PCT/JP2012/072945, filed on Sep. 7, 2012 and designated the U.S., the entire contents of which are incorporated herein by reference.

FIELD

The embodiments discussed herein are directed to an information processing apparatus, a parallel computer system, and a control method for controlling the information processing apparatus.

BACKGROUND

In the past, there has been known a parallel computer system in which a plurality of information processing apparatuses (nodes) performs mutual data transmission and reception and performs arithmetic processing. As an example of such a parallel computer system, there is known a parallel computer system that mutually connects a plurality of information processing apparatuses, which does not share a memory space, to one another through a mutual connection network.

The information processing apparatus included in the parallel computer system includes a main memory that is a main storage device storing data to be used in an arithmetic operation, an arithmetic processing unit that performs the arithmetic operation, and a network interface (communication device) that performs transmission and reception of data used in the arithmetic operation between other information processing apparatuses. The network interface used in the information processing apparatus performs transmission and reception of data related to the arithmetic operation with another information processing apparatus through the mutual connection network and stores the received data in the main memory. Here, when a cache line of a processor corresponding to an address of a written main memory is valid, processing of invalidating the cache line is needed for maintaining consistency of the main memory and the cache memory.

PATENT DOCUMENTS

Patent Document 1: Japanese Laid-open Patent Publication No. 04-289935
Patent Document 2: Japanese Laid-open Patent Publication No. 09-128324

However, in the parallel computer system of the related art, when data is received and written to the main memory in data communication between nodes, there is a case where data is not aligned in a predetermined alignment size. In a case where the data is not aligned, a latency of writing in the main memory is lengthened. In the following, a case where a latency is lengthened will be described.

(1) As a case where data and an error check and correct (ECC) are stored in the main memory, in a case where a received data length is not aligned in an ECC generation unit size, it is necessary to recalculate the ECC by reading the lacking data from the main memory. Since it is necessary to read the data once from the main memory, a write latency is lengthened.

(2) A cache provided in a processor of a reception node caches an address to write received data in a write-back method. The cache line is a so-called dirty state in which updated data is not written back in the main memory and is case where received data is not aligned in a cache line size. In such a case, a region that is not to be written in the cache line needs to be written back to the main memory. In a case where the received data is aligned in the cache line size, it is unnecessary to write back data to the main memory. Therefore, in a case where the received data is not aligned in the cache line size, a latency is lengthened as compared to a case where the received data is aligned in the cache line size.

SUMMARY

According to an aspect of the embodiments, the information processing apparatus, which is one of a plurality of information processing apparatuses included in a parallel computer system, includes: storage devices that store data; a data generation unit that generates padding-added data by adding padding to the data, based on adjustment information included in received data; and a storage processing unit that stores the padding-added data generated by the data generation unit in the storage devices.

According to an aspect of the embodiments, an information processing apparatus, which is one of a plurality of information processing apparatuses included in a parallel computer system, includes: storage devices that store data; a determination unit that determines necessity or non-necessity of adjustment of received data, based on data size information and write destination address information of the received data and adjustment size information; a data generation unit that generates padding-added data by adding padding matched with the adjustment size information to the data, based on the data size information and the write destination address information of the received data and the adjustment size information, when the determination unit determines that the adjustment is necessary; and a storage processing unit that stores the padding-added data generated by the data generation unit in the storage devices.

According to an aspect of the embodiments, a parallel computer system with a plurality of information processing apparatuses includes: a first information processing apparatus that transmits data having adjustment information; and a second information processing apparatus including: storage devices that store data; a data generation unit that generates padding-added data by adding padding to the data, based on adjustment information included in received data; and a storage processing unit that stores the padding-added data generated by the data generation unit in the storage devices.

According to an aspect of the embodiments, a parallel computer system includes: a plurality of information processing apparatuses, wherein the information processing apparatus includes: storage devices that store data; a determination unit that determines necessity or non-necessity of adjustment of received data, based on data size information and write destination address information of the received data and adjustment size information; a data generation unit that generates padding-added data by adding padding matched with the adjustment size information to the data, based on the data size information and the write destination address information of the received data and the adjustment size information, when the determination unit determines that the adjustment is necessary; and a storage processing unit that stores the padding-added data generated by the data generation unit in the storage devices.

According to an aspect of the embodiments, a control method for controlling an information processing apparatus, which constitutes a parallel computer system including a plurality of information processing apparatuses, includes: transmitting data including adjustment information; generating padding-added data by adding padding to the data, based on the adjustment information included in the received data; and storing the generated padding-added data in storage devices.

According to an aspect of the embodiments, a control method for controlling an information processing apparatus, which constitutes a parallel computer system including a plurality of information processing apparatuses, includes: determining necessity or non-necessity of adjustment of received data, based on data size information and write destination address information of the received data and adjustment size information; generating padding-added data by adding padding matched with the adjustment size information to the data, based on the data size information and the write destination address information of the received data and the adjustment size information, when it is determined that the adjustment is necessary; and storing the generated padding-added data in storage devices.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram schematically illustrating a format of a transmission packet in a parallel computer system as an example of a first embodiment.

FIG. 8 is a diagram schematically illustrating a format of a transmission packet in a parallel computer system as an example of a second embodiment.

DESCRIPTION OF EMBODIMENT(S)

Figure 1:
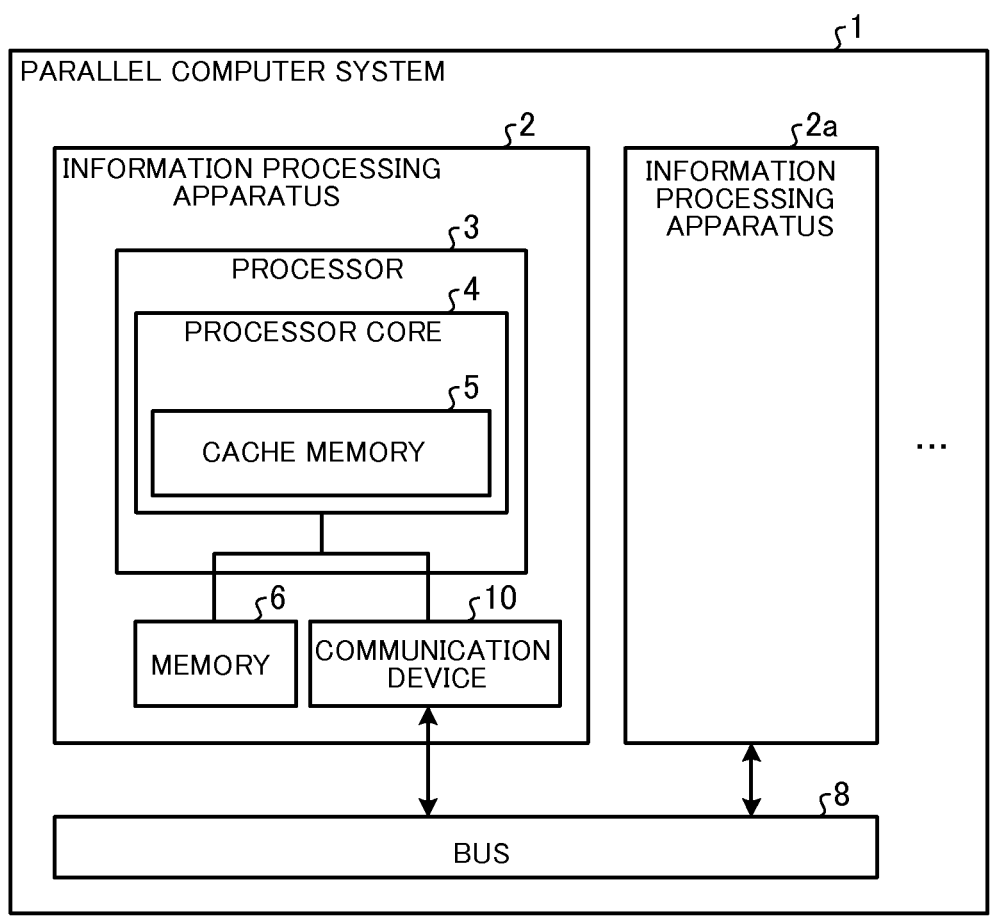
FIG. 1 is a diagram for describing a parallel computer system as an example of a first embodiment.

Hereinafter, an information processing apparatus, a parallel computer system, and a control method for controlling the information processing apparatus according to embodiments will be described with reference to the drawings. However, the following embodiments are merely exemplary. Unless otherwise specified in the following embodiments, the following embodiments are not intended to exclude various modifications or technical applications. That is, the present embodiments can be carried out in various forms (embodiments and combinations of examples thereof) without departing from the scope of the present embodiments. In addition, each drawing can include other functions or the like, instead of the effect that includes only components illustrated in the drawing.

(A) First Embodiment

In the following first embodiment, an example of a parallel computer system will be described with reference to FIG. 1. FIG. 1 is a diagram for describing a parallel computer system as an example of a first embodiment.

As illustrated in FIG. 1, the parallel computer system 1 includes a plurality of information processing apparatuses 2 and 2a, and a bus 8 that connects the respective information processing apparatuses 2 and 2a. In the example illustrated in FIG. 1, the information processing apparatuses 2 and 2a are described, but the parallel computer system 1 may include more information processing apparatuses. The parallel computer system 1 may include an arbitrary number of information processing apparatuses. Also, in the following description, since the information processing apparatus 2*a* performs the same processing as the information processing apparatus 2, a description thereof will be omitted. In addition, hereinafter, there is a case where the information processing apparatuses 2 and 2*a* are referred to as nodes.

The information processing apparatus 2 includes a processor 3, a memory 6, and a communication device (network interface) 10. The processor 3, the memory 6, and the communication device 10 are connected to one another by the bus included in the information processing apparatus 2. The processor 3 is an arithmetic processing unit that performs arithmetic processing. Specifically, the processor 3 includes a processor core 4 that performs an arithmetic operation. In addition, the processor core 4 includes a cache memory 5.

Hereinafter, data stored in the memory 6 and the cache memory 5 is described, and then, processing performed by the processor core 4 and the communication device 10 is described.

The memory 6 is a main memory (main storage device) included in the information processing apparatus 2 and holds data that is used in the arithmetic operation by the processor core 4.

Figure 2:
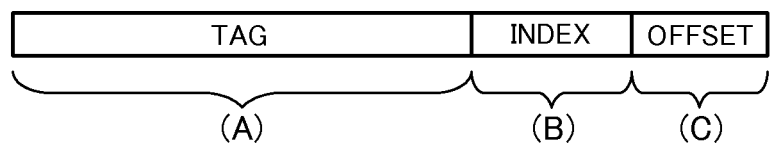
FIG. 2 is a diagram for describing an example of a memory address.
Figure 3:
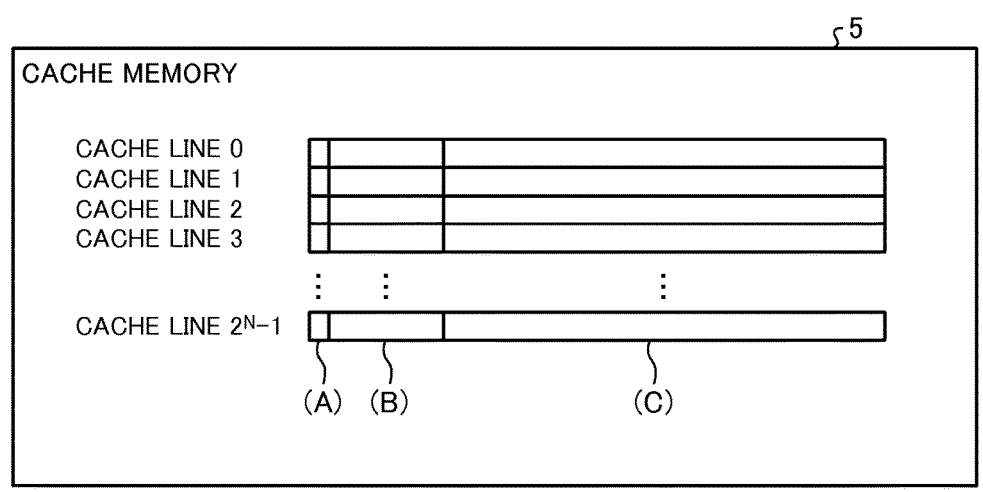
FIG. 3 is a diagram for describing an example of a cache memory according to a parallel computer system as an example of a first embodiment.

Hereinafter, an example of the memory 6 will be described with reference to FIGS. 2 and 3. FIG. 2 is a diagram for describing an example of a memory address. For example, in a case where the processor 3 has a 40-bit memory address space, a memory address indicating a storage area of the memory 6 is, for example, a memory address having a length of 40 bits. In such a case, for example, the memory address can be divided into upper "34-N" bits of a range illustrated in FIG. 2(A) as a tag, "N" bits of a range illustrated in FIG. 2(B) as an index, and lower "6" bits of a range illustrated in FIG. 2(C) as an offset. Here, it is assumed that the size of the index can set an arbitrary number of bits. In the following description, it is assumed that "N" bits are set as the index.

The cache memory 5 is a storage device that stores data used in the arithmetic operation by the processor and can perform data input and output at a higher speed than the memory 6. Hereinafter, an example of the cache memory 5 will be described. FIG. 3 is a diagram for describing an example of the cache memory according to the parallel computer system as the example of the first embodiment. For example, the cache memory 5 is a cache memory that includes 2N cache lines each having a line size of 64 bytes and has a total storage capacity of 2N+6 bytes.

Here, cache line numbers "0" to "2N−1" are assigned to the cache lines, respectively. Also, 2-bit state data illustrated in FIG. 3(A), "(34-N)"-bit tag data illustrated in FIG. 3(B), and 64-byte data illustrated in FIG. 3(C) are stored in each of the cache lines. Here, one bit of the state data is a valid bit that indicates whether or not data stored in a corresponding cache line is valid. For example, in a case where "1" is stored in the valid bit, it is indicated that the data stored in the corresponding cache line is valid, and in a case where "0" is stored in the valid bit, it is indicated that the data stored in the corresponding cache line is invalid.

Also, the other bit of the state data is a dirty bit that is information for holding the identity between data stored in the corresponding cache line and data stored in the memory 6. For example, in a case where "1" is stored in the dirty bit, it is indicated that since the data stored in the corresponding cache line is updated by the processor core 4, it is necessary to write back the data to the memory 6. In a case where "0" is stored in the dirty bit, it is indicated that the data stored in the corresponding cache line is not updated by the processor core 4, and the data stored in the corresponding cache line is identical to the data stored in the memory 6. For example, in a case where data stored in the cache line has "1" as the valid bit and "1" as the dirty bit, the data is valid data and is not identical to data stored in the memory 6 that is a cache source for rewriting or the like by the processor core 4.

In addition, in a case where the cache memory 5 adopts a direct map method and data of the memory 6 is cached, data is stored in the cache line corresponding to the index of the memory address at which the cache source data is stored. For example, in a case where the index of the memory address at which the cache source data is stored is "i", the cache memory 5 stores data in the cache line whose cache line number is "i". However, in the cache memory 5, a set associative method having a plurality of cache ways may be adopted.

Returning to FIG. 1, the processor core 4 is an arithmetic processing unit that performs an arithmetic operation by using data. Specifically, the processor core 4 performs arithmetic processing by using data stored in the memory 6 or the cache memory 5. In addition, the processor core 4 acquires data stored in the memory 6 and stores the acquired data in the cache memory 5. That is, the processor core 4 holds the data, which has been stored in the memory 6, in the cache memory 5. Then, the processor core 4 performs arithmetic processing by using the data stored in the cache memory 5.

Also, in a case where the processor core 4 performs arithmetic processing by using the result of the arithmetic operation by another information processing apparatus such as the information processing apparatus 2*a*, the processor core 4 waits until the communication device 10 receives data transmitted from another arithmetic processing unit. That is, the processor core 4 performs polling processing that waits data of the operation result by another information processing apparatus. In a case where the communication device 10 receives data subjected to the polling processing, the processor core 4 senses the reception and performs arithmetic processing using the received data.

Next, an example of processing performed by the processor core 4 will be described. For example, in a case where the data from the communication device 10 is received as the data to be stored in the memory 6, the processor core 4 performs the following processing. That is, the processor core 4 references the valid bit and the dirty bit that are the state data of the cache line corresponding to the index of the memory address to store data. Then, when the reference valid bit is "1" and the referenced dirty bit is "1", the processor core 4 performs the following processing.

That is, the processor core 4 updates the cache source data stored in the memory 6 with the latest data by using the cached data stored in the cache memory 5. The processor core 4 updates the referenced valid bit from "1" to "0", and then, stores the data received from the communication device 10 at the memory address of the memory 6 received together with the data.

Also, in a case where the referenced valid bit is "0", or in a case where the valid bit is "1" and the dirty bit is "0", the processor core 4 updates the valid bit to "0" and stores the received data in the memory 6.

Returning to FIG. 1, the communication device 10 receives packetized data from another information processing apparatus, including the information processing apparatus 2*a*, through the bus 8. Here, data and a memory address of the memory 6 storing the data are stored in the packetized data. The communication device 10 stores the received data in the memory 6.

Also, in a case where the data and the information indicating another information processing apparatus 2a of the transmission destination is received from the processor 3 (processor core 4), the communication device 10 packetizes the received data and transmits the packet to another information processing apparatus 2a of the transmission destination through the bus 8. In addition, in a case where the effect that the received data is data waited by the processor included in another information processing apparatus 2a is received from the processor core 4, the communication device 10 packetizes the received data and adds control information to the packet so as to indicate that the received data is subjected to the polling processing. Then, the communication device 10 transmits the packet, to which the control information is added, to another information processing apparatus 2a of the transmission destination.

Figure 4:
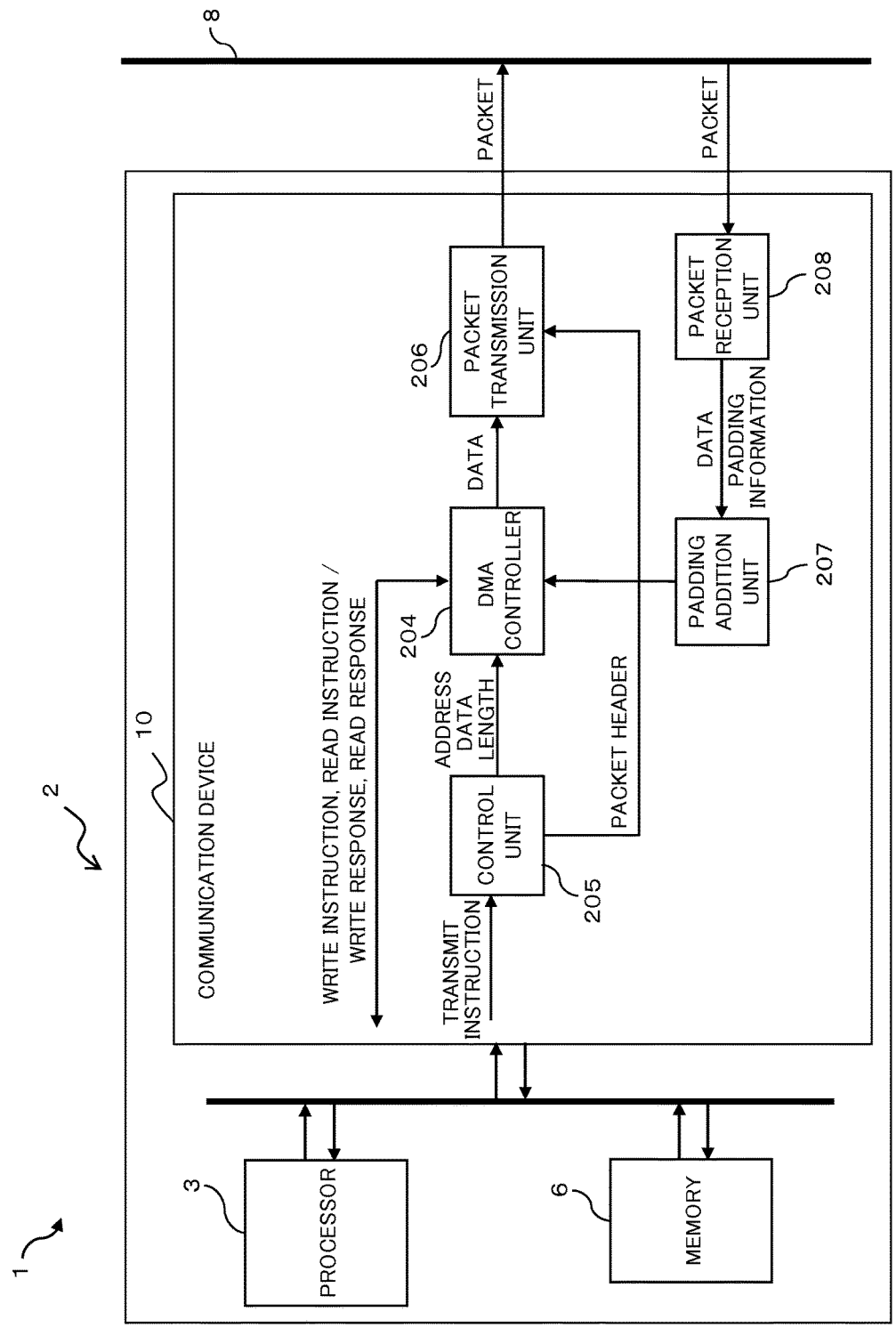
FIG. 4 is a diagram illustrating a functional configuration of a communication device according to a parallel computer system as an example of a first embodiment.

Hereinafter, an example of the communication device 10 will be described with reference to FIG. 4. FIG. 4 is a diagram illustrating a functional configuration of the communication device according to the parallel computer system as the example of the first embodiment. In the example illustrated in FIG. 4, the communication device 10 includes a direct memory access (DMA) controller 204, a control unit 205, a packet transmission unit 206, a padding addition unit 207, and a packet reception unit 208.

The DMA controller (storage processing unit) 204 is a bus master. When an address and a data length of data performing a DMA are notified from the control unit 205 to be described below, the DMA controller 204 performs a DMA request to the memory 6 by designating the address and the data size notified by the control unit 205. Then, the memory 6 DMA-transmits the data stored at the designated address by the designated data length to the DMA controller 204. The DMA controller 204 transmits the data DMA-transmitted from the memory 6 to the packet transmission unit 206.

Also, the DMA controller 204 writes DMA write data to a region over a DMA write length from a DMA write beginning address of the memory 6. Then, the DMA controller 204 writes the padding-added data, which is generated by the padding addition unit 207 to be described below, to the processor 3 and the memory 6 as DMA write data.

When a packet transmission instruction is received from the processor 3, the control unit 205 performs packet transmission processing by controlling the DMA controller 204, the packet transmission unit 206, the packet reception unit 208, or the like. In a case where the packet transmission processing is performed, the control unit 205 reads data to be transmitted from the memory 6 by designating the data length of the data included in a single packet to the DMA controller 204. The length (size) of the packet that is transmitted from the information processing apparatus 2 may be constant (fixed) and may be variable.

When data (payload) to be transmitted is received, the control unit 205 generates a packet (transmission packet) by adding a header to the data, delivers the generated packet to the packet transmission unit 206, and transmits the delivered packet to the bus 8. That is, the control unit 205 functions as a packet generation unit that generates a packet to be transmitted.

The control unit 205 packetizes the data to be transmitted, and stores, in the packet, the memory address or the like of another information processing apparatus 2a of the transmission destination or the memory included in another information processing apparatus 2a of the transmission destination storing the data. Then, the control unit 205 transmits the generated packet to the packet transmission unit 206.

For example, the packet to be transmitted includes a header part that stores an address indicating another information processing apparatus 2a of the transmission destination, and a data part that stores data.

FIG. 5 is a diagram schematically illustrating a format of a transmission packet in the parallel computer system as the example of the first embodiment.

For example, as illustrated in FIG. 5, the transmission packet includes fields storing a packet type, a routing header, a local node address, a remote node address, an offset, a padding flag, an alignment size, and a payload, respectively. The packet type is information indicating a type of the corresponding packet. For example, the packet type indicates a packet used in a put request (put communication) or a packet used in a get request (get communication).

Here, the put communication indicates communication in which the local node designates the area of the memory 6 of the local node itself and the area of the memory 6 of the remote node and data of the memory 6 of the local node is written to the area of the memory 6 of the remote node.

Also, the get communication indicates communication in which the local node designates the area of the memory 6 of the local node itself and the area of the memory 6 of the remote node and data of the remote node is written to the area of the memory 6 of the local node.

The local node address is information that indicates the address (node address) of the transmission source node of the corresponding packet, and the remote node address is information that indicates the address of the transmission destination node of the corresponding packet. For example, such node addresses are expressed as coordinate values of each dimension.

The routing header is information that designates the path of the corresponding packet. For example, the routing header is a coordinate value that indicates the position of the remote node when the position of the transmission source node (local node) of the corresponding packet on the bus 8 is set as the origin. For example, the routing header is expressed as a coordinate value of each dimension.

The payload is data that is obtained by dividing, as necessary, a message (data source) to be transmitted to the transmission destination node by the transmission source node. The offset is information that designates the address of the memory 6 to store the payload.

The padding flag (necessity/non-necessity information) is information that indicates necessity or non-necessity of alignment with respect to the packet. For example, in data that is not aligned in a predetermined size such as a cache line size, the effect of being valid (for example, "1") is set to the padding flag. That is, in a case where "1 (valid)" is set to the padding flag, the padding addition unit 207 to be described below adds padding matched with the alignment size.

On the other hand, in data that is aligned in a cache line size or the like, the effect of being invalid (for example, "0") is set to the padding flag. That is, in a case where "0 (invalid)" is set to the padding flag, the padding addition unit 207 does not perform the addition of the padding.

Here, the padding is processing that matches the length by adding meaningless data (for example, "0") before or after short data so as to match the data with a specific length. In the present embodiment, the padding addition unit 207 to be described below performs so-called "zero padding" that matches the length by adding "0" to the data as many as deficient digits.

The alignment size (adjustment size information) is a size that aligns the packet by padding, and the padding addition unit 207 adds the padding to the payload of the corresponding packet matched with the alignment size. For example, the alignment size is an ECC generation unit or a cache line size of the cache memory 5.

For example, the padding flag and the alignment size may be input (set) by an application (not illustrated) operating on the information processing apparatus 2 or may be input by an operator. The padding flag and the alignment size are added to the transmission packet as the padding information (adjustment information) by the control unit 205.

The packet reception unit 208 receives the packet transmitted from another information processing apparatus 2 or the like through the bus 8, and performs reception processing such as delivery of the payload to the processor 3.

Also, the packet reception unit 208 transmits the data and the padding information (padding flag and alignment size), which are stored in the payload of the packet, to the padding addition unit 207.

In a state in which the corresponding information processing apparatus 2 is the transmission source node, the packet transmission unit 206 transmits the packet generated by the control unit 205 to the information processing apparatus 2 of the destination.

When the packet header and the data are received from the control unit 205 and the DMA controller 204, the packet transmission unit 206 generates the packet and transmits the generated packet to the bus 8.

Also, in a state in which the corresponding information processing apparatus 2 is the transmission destination node, the packet transmission unit 206 generates and transmits a response packet to the information processing apparatus 2 of the transmission source of the received packet.

The padding addition unit (data generation unit, determination unit) 207 generates padding-added data by adding padding to the data received by the packet reception unit 208. In a case where "1 (valid)" is set as the padding flag in the padding information received from the packet reception unit 208, the padding addition unit 207 generates the padding-added data by adding the padding such that the data is aligned in an alignment size.

The padding addition unit 207 calculates a length p_f of the padding, which is to be added to the beginning of the payload, by using the following Formula (1).

$$p\_f = \text{payload write beginning address} - (n \times \text{alignment size}) \quad (1)$$

However, $$n = \text{floor}(\text{payload write beginning address} / \text{alignment size}) \quad (2)$$

Here, floor is a floor function, and n is an integer value obtained by rounding down a fractional part of "payload write beginning address/alignment size".

Also, the padding addition unit 207 calculates a length p_e of the padding, which is to be added to the end of the payload, by using the following Formula (3).

$$p\_e = (m \times \text{alignment size}) - (p\_f + \text{length of payload}) \quad (3)$$

However, $$m = \text{ceil}((\text{length of payload} + p\_f) / \text{alignment size}) \quad (4)$$

Here, ceil is a ceil function, and m is an integer value obtained by rounding up a fractional part of "(length of payload+p_f)/alignment size".

Also, the padding addition unit 207 sets "n×alignment size" to a DMA write beginning address and sets "m×alignment size" to a DMA write length.

The padding addition unit 207 transmits the generated padding-added data to the DMA controller 204. The DMA controller 204 writes the padding-added data to the memory 6.

Also, in a case where "0 (invalid)" is set as the padding flag in the padding information, the padding addition unit 207 transmits the data received by the packet reception unit 208 to the DMA controller 204.

Figure 6:
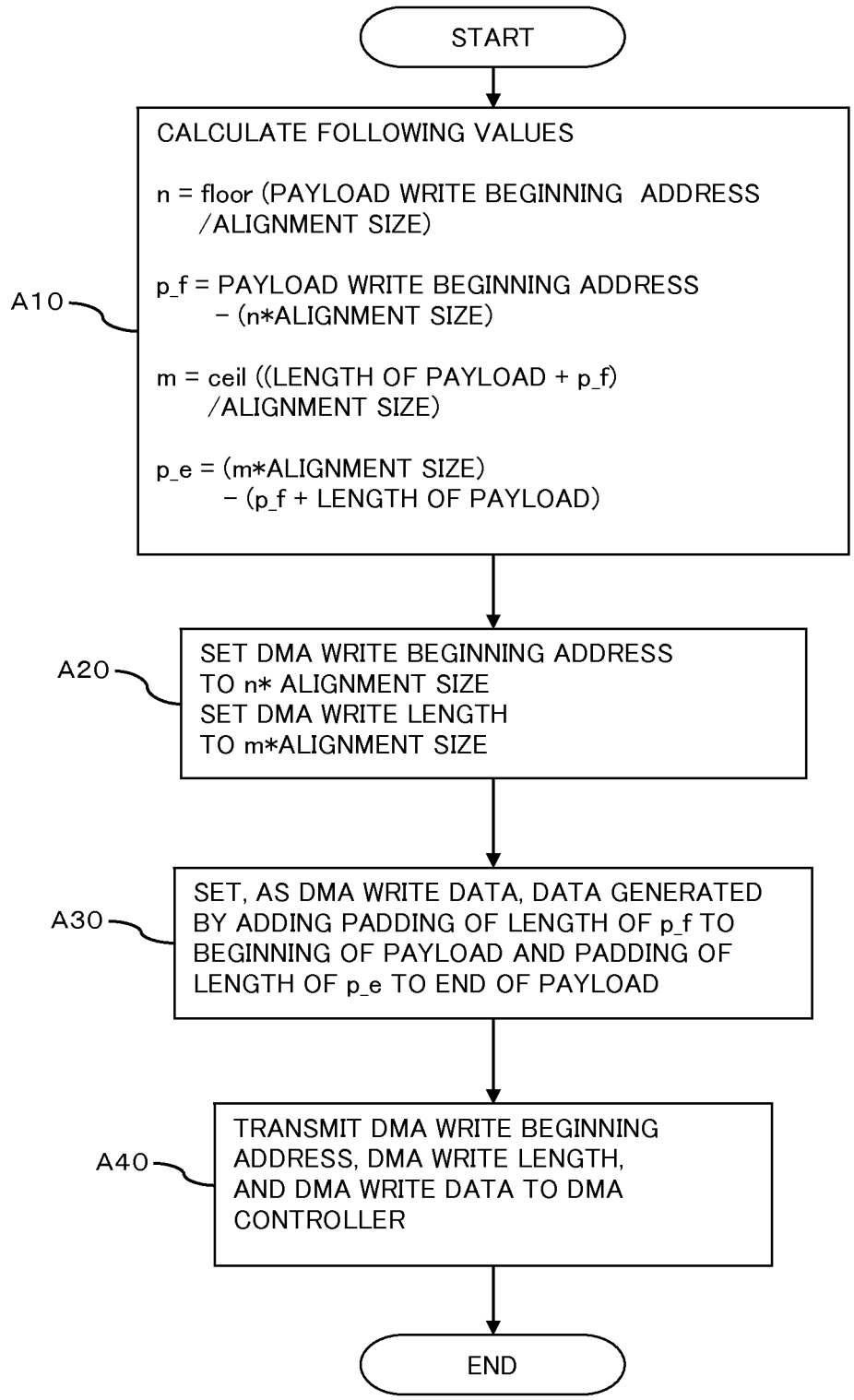
FIG. 6 is a flowchart for describing a process of a padding addition unit of an information processing apparatus in a parallel computer system as an example of a first embodiment.

The processing of the padding addition unit 207 of the information processing apparatus 2 in the parallel computer system 1 as the example of the first embodiment will be described with reference to a flowchart (steps A10 to A40) illustrated in FIG. 6.

In step A10, the padding addition unit 207 calculates the values of n, p_f, m, and p_e by calculating Formulas (1) to (4) above.

Then, in step A20, "n×alignment size" is set to the DMA write beginning address and "m×alignment size" is set to the DMA write length.

Then, in step A30, the padding addition unit 207 generates padding-added data by adding the padding of a length of p_f to the beginning of the payload and adding the padding of a length of p_e to the end of the payload. The padding-added data is DMA write data that is written to the memory 6 by the DMA controller 204.

In step A40, the padding addition unit 207 transmits the DMA write beginning address and the DMA write length, which are set in step A20, and the DMA write data (padding-added data) to the DMA controller 204 and ends the processing. Since the payload is aligned by the padding addition unit 207, the address and the length of the payload become the address and the length of the DMA as they are.

The DMA controller 204 writes the DMA write data (padding-added data) to a region over the DMA write length from the DMA write beginning address of the memory 6.

Figure 7:
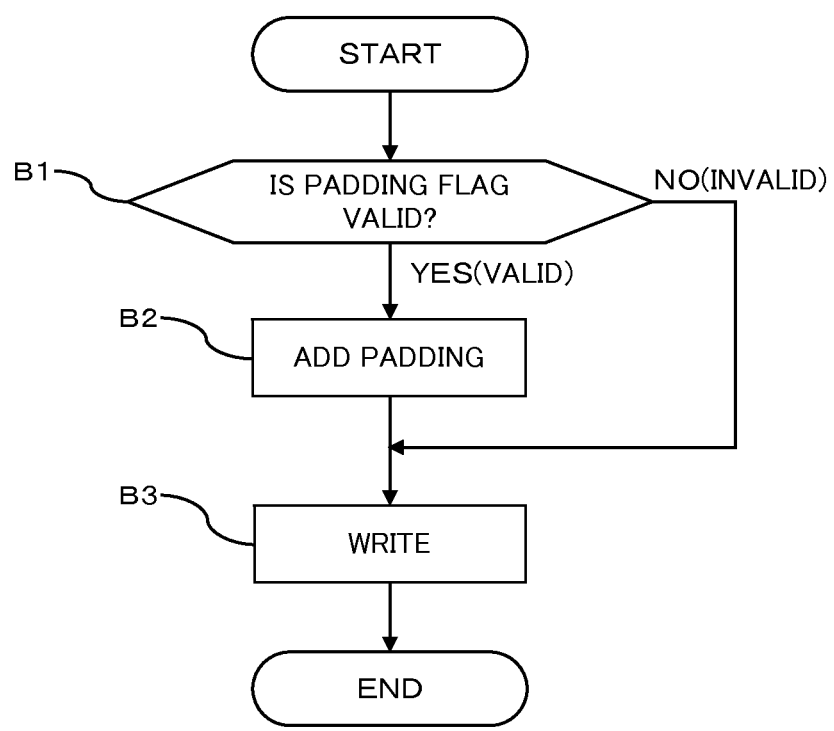
FIG. 7 is a flowchart for describing processing at the time of data reception of a communication device of an information processing apparatus in a parallel computer system as an example of a first embodiment.

The processing at the time of data reception of the communication device 10 of the information processing apparatus 2 in the parallel computer system 1 as the example of the first embodiment, which is configured as described above, will be described with reference to a flowchart (step B1 to B4) illustrated in FIG. 7.

The packet reception unit 208 of the communication device 10 receives the data and transmits the data and the padding information (padding flag and alignment size), which are stored in the payload of the packet, to the padding addition unit 207.

In step B1, the padding addition unit 207 determines whether or not the padding flag is valid with reference to the padding information. In a case where "1" is set in the padding flag, that is, in a case where the padding flag is valid (see YES route of step B1), the padding addition unit 207 adds the padding to the payload in step B2. That is, the padding addition unit 207 performs processing according to the flowchart illustrated in FIG. 6.

After that, in step B3, the DMA controller 204 writes the DMA write data (padding-added data) to a region over the DMA write length from the DMA write beginning address of the memory 6 and ends the processing.

On the other hand, in a case where it is determined in step B1 that "0" is set in the padding flag, that is, in a case where the padding flag is invalid (see NO route of step B1), the processing proceeds to step B3.

As such, in the information processing apparatus 2 of the parallel computer system 1 as the example of the first embodiment, the padding addition unit 207 generates the padding-added data by adding the padding to the payload in a case where it is determined that the padding flag is valid, with reference to the padding information added to the received data. The DMA controller 204 writes the padding-added data to the memory 6. Therefore, even when the received data is not aligned, the padding addition unit 207 aligns the data, thereby shortening a latency when the data is written to the memory 6.

In the transmission source, by adding the padding information (padding flag and padding size) to the data to be transmitted, it is possible to control whether to perform the padding at the time of data reception in the information processing apparatus 2 of the transmission destination, thereby increasing convenience.

Also, the padding addition unit 207 calculates the length p_f of the padding performed to the beginning of the payload and the length p_e of the padding performed to the end of the payload by using Formulas (1) to (4) described above, and generates the padding-added data.

Furthermore, the padding addition unit 207 transmits the generated padding-added data to the DMA controller 204. The DMA controller 204 writes the padding-added data to the memory 6. In this way, the padding-added data can be easily generated. That is, the alignment of the data can be easily realized.

Also, the padding addition unit 207 sets the DMA write beginning address to "n×alignment size" and sets the DMA write length to "m×alignment size", based on the values of n and m calculated by Formulas (2) and (4). Then, the DMA controller 204 can write the data to the memory 6 at a small latency by writing the padding-added data to a region over the DMA write length from the DMA write beginning address of the memory 6.

(B) Second Embodiment

In the first embodiment described above, the information processing apparatus 2a of the destination source transmits the packet including the padding flag and the alignment size. Then, in the information processing apparatus 2 of the transmission destination, the padding addition unit 207 generates the padding-added data based on the padding information, but is not limited thereto. In a parallel computer system as an example of a second embodiment, a padding flag and an alignment size are not included in a transmission packet.

Figure 9:
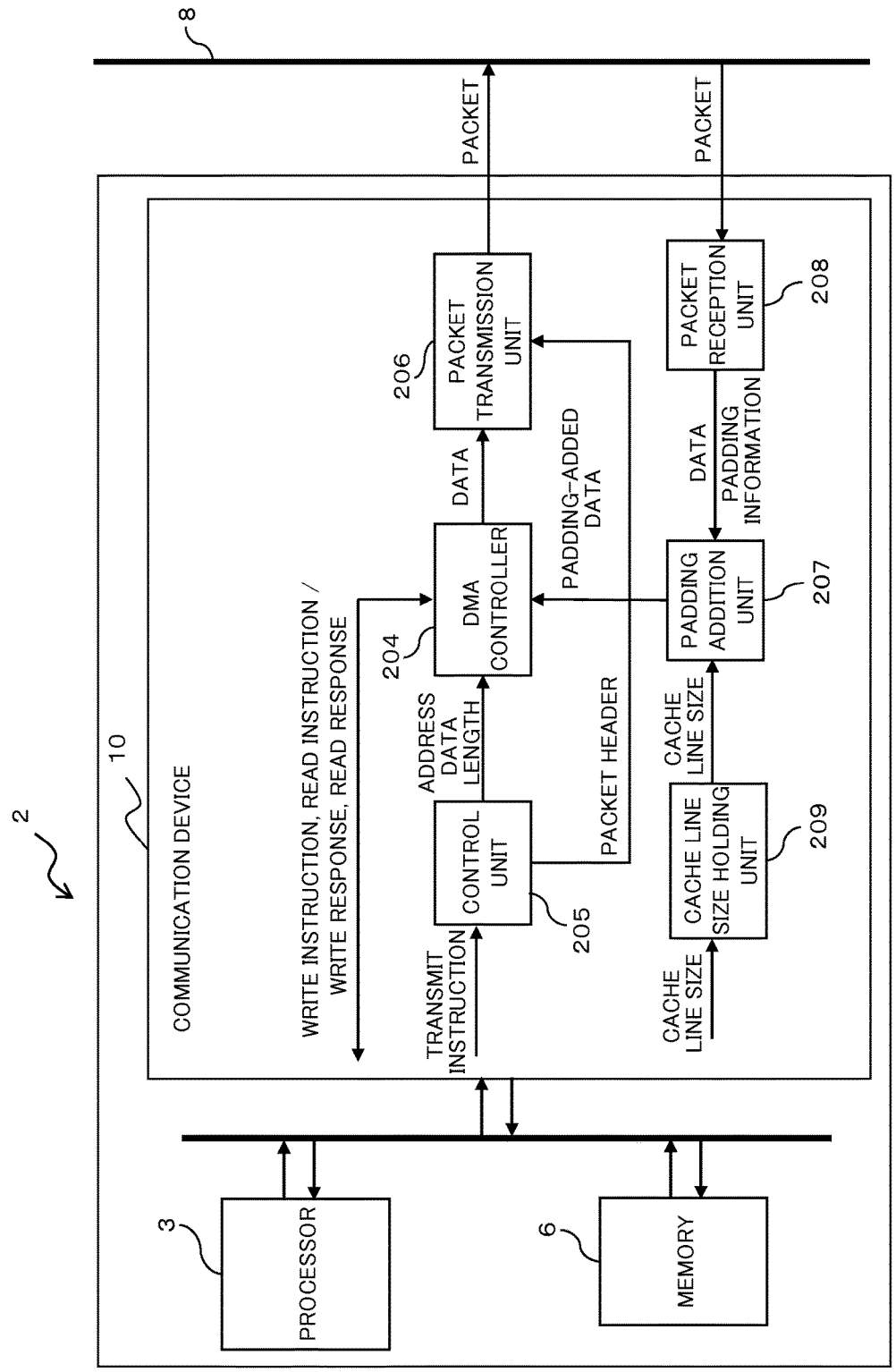
FIG. 9 is a diagram illustrating a functional configuration of a communication device according to a parallel computer system as an example of a second embodiment.

FIG. 8 is a diagram schematically illustrating a format of a transmission packet in a parallel computer system 1 as an example of a second embodiment, and FIG. 9 is a diagram illustrating a functional configuration of a communication device according to the parallel computer system. Incidentally, in the drawing, since the same fields as those described above indicate the same parts, a description thereof will be omitted.

As illustrated in FIG. 8, the transmission packet includes fields storing a packet type, a routing header, a local node address, a remote node address, an offset, and a payload, respectively.

As illustrated in FIG. 9, the information processing apparatus 2 in the parallel computer system 1 of the second embodiment has the same configuration as the information processing apparatus 2 of the first embodiment, except that the communication device 10 includes a cache line size holding unit (adjustment size information storage unit) 209 in addition to the communication device 10 of the first embodiment.

The cache line size holding unit (adjustment size information storage unit) 209 is a storage device (memory) that holds the cache line size (adjustment information, adjustment size information) of the cache memory 5 of the processor 3. The cache line size holding unit 209 stores the cache line size notified from the processor 3. It is preferable that the processor 3 notifies the cache line size to the cache line size holding unit 209 at a predetermined timing, for example, at the time of starting the corresponding information processing apparatus 2.

Also, the padding addition unit 207 determines whether or not the payload is aligned, based on the packet received by the packet reception unit 208. Specifically, in a case where the payload write beginning address of the received packet is a multiple of the alignment size and the payload length is a multiple of the alignment size, the padding addition unit 207 determines that the data is aligned.

Then, in a case where it is determined that the payload is not aligned, the padding addition unit 207 generates the padding-added data by adding padding to the data received by the packet reception unit 208.

In the second embodiment, the padding addition unit 207 reads the cache line size from the cache line size holding unit 209 as the alignment size and uses the read cache line size in the calculation of Formulas (1) to (4) described above.

Figure 10:
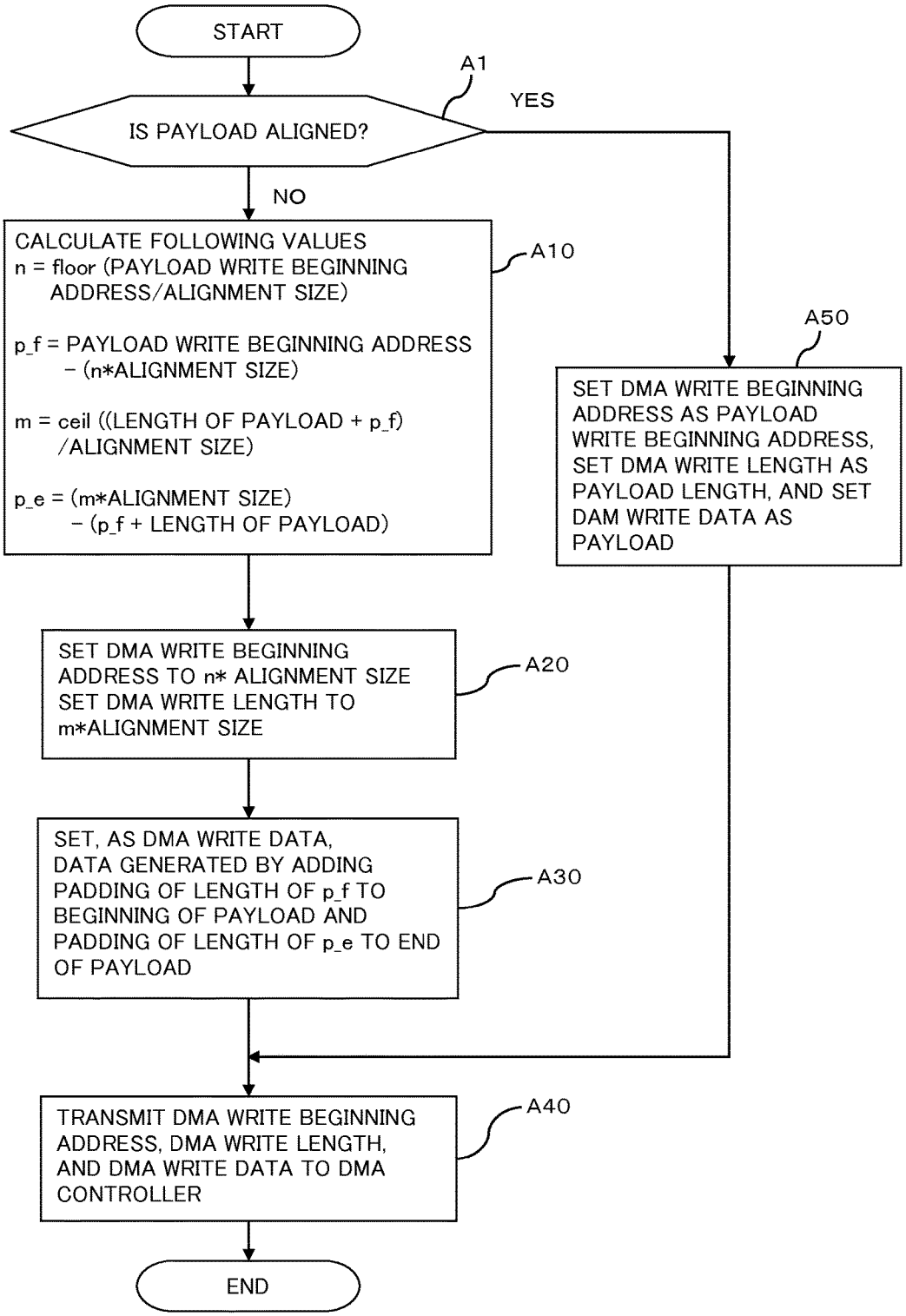
FIG. 10 is a flowchart for describing a process of a padding addition unit of an information processing apparatus in a parallel computer system as an example of a second embodiment.

The processing of the padding addition unit 207 of the information processing apparatus 2 in the parallel computer system 1 as the example of the second embodiment, which is configured as described above, will be described with reference to a flowchart (steps A1 and A10 to A50) illustrated in FIG. 10. In the drawing, since the same reference signs as those described above indicate the same processing, a description thereof will be omitted.

First, in step A1, the padding addition unit 207 determines whether or not the payload is aligned, based on the packet received by the packet reception unit 208.

In a case where it is determined that the payload is not aligned (see NO route of step A1), the padding addition unit 207 generates padding-added data by adding padding to the data received by the packet reception unit 208. That is, the processing of steps A10 to A40 is performed.

On the other hand, in a case where the payload is aligned (see YES route of step A1), in step A50, the padding addition unit 207 sets the write beginning address of the payload as the DMA write beginning address, and sets the payload length as the DMA write length. Furthermore, the payload is set as the DMA write data.

After that, in step A40, the padding addition unit 207 transmits the DMA write beginning address and the DMA write length, which are set in step A20, and the DMA write data to the DMA controller 204 and ends the processing. The DMA controller 204 writes the DMA write data to a region over the DMA write length from the DMA write beginning address of the memory 6.

In this way, in the information processing apparatus 2 of the parallel computer system 1 as the example of the second embodiment, the padding addition unit 207 of the communication device 10 determines whether or not the payload is aligned, based on the packet received by the packet reception unit 208. Then, in a case where it is determined that the payload is not aligned, the padding addition unit 207 generates the padding-added data by adding padding to the payload. Therefore, as in the first embodiment, even when the received data is not aligned, it is possible to shorten a latency when the data is written to the memory 6.

Also, as compared to the first embodiment, in the transmission source, it is unnecessary to add the padding information (padding flag and padding size) to the data to be transmitted, and it is unnecessary to modify the information processing apparatus 2 of the transmission side. Therefore, the parallel computer system can be easily introduced to the existing system and is very convenient and cost-effective.

Also, the padding addition unit 207 calculates the length p_f of the padding performed to the beginning of the payload and the length p_e of the padding performed to the end of the payload by using Formulas (1) to (4) described above, and generates the padding-added data.

Furthermore, the padding addition unit 207 transmits the generated padding-added data to the DMA controller 204. The DMA controller 204 writes the padding-added data to the memory 6. In this way, the padding-added data can be easily generated.

Also, the padding addition unit 207 sets the DMA write beginning address to "n×alignment size" and sets the DMA write length to "m×alignment size", based on the values of n and m calculated by Formulas (2) and (4). Then, the DMA controller 204 can write the data to the memory 6 at a small latency by writing the padding-added data to a region over the DMA write length from the DMA write beginning address of the memory 6.

(C) Third Embodiment (C-1) Example 1

In the parallel computer system 1 as the example 1 of the third embodiment, in addition to the function as the parallel computer system 1 of the first embodiment described above, a processor core 4 has a function of storing received data to a cache memory 5 and a memory 6 in a case where the data is received from a communication device 10 as data stored in the cache memory 5.

Then, when the data is stored in the cache memory 5 or the memory 6, in a case where the data is not aligned, the padding addition unit 207 stores padding-added data generated by adding padding to the payload.

Even in the parallel computer system 1 of the example 1 of the third embodiment, in a case where the processor core 4 performs arithmetic processing by using the result of the arithmetic operation by another information processing apparatus such as the information processing apparatus 2a, the processor core 4 waits until the communication device 10 receives data transmitted from another arithmetic processing unit. That is, the processor core 4 performs polling processing that waits data of the operation result by another information processing apparatus.

Then, in the parallel computer system 1 of the example 1 of the third embodiment, in a case where the communication device 10 receives data subjected to the polling processing, the processor core 4 acquires the received data and stores the acquired data in the cache memory 5 and the memory 6.

Here, an example of the processing of storing the data received by the processor core 4 in the cache memory 5 and the memory 6 will be described. For example, in a case where the data from the communication device 10 to be described below is received as the data to be stored in the memory 6, the processor core 4 stores the received data in the memory 6.

Also, in a case where the data from the communication device 10 is received as the data to be written to the cache memory 5, the processor core 4 performs the following processing. That is, the processor core 4 stores the received data in the memory 6 and stores the received data in the cache memory 5. That is, in a case where the data from the communication device 10 is received as the data to be stored in the cache memory 5, the processor core 4 stores the received data in the cache memory 5 and the memory 6.

Here, in a case where the received data is stored in the cache memory 5, the processor core 4 references information for holding the identity between the data stored in the cache memory 5 and the data stored in the memory 6. Then, the processor core 4 discharges the data stored in the cache memory 5 to the memory 6, based on the referenced information for holding the identity, and then, stores the received data in the cache memory 5. Then, the processor core 4 performs arithmetic processing by using the data stored in the cache memory 5, that is, the data subjected to the polling processing.

Also, as the result of the arithmetic operation, in a case where the calculated data is transmitted to another information processing apparatus, the processor core 4 transmits information indicating the information processing apparatus of the transmission destination and the calculated data to the communication device 10. At this time, the processor core 4 determines whether or not the calculated data is data waited by a processor core included in another information processing apparatus. Then, in a case where it is determined that the calculated data is the data waited by the processor core included in another information processing apparatus, the processor core 4 transmits to the communication device 10 the effect that the calculated data is the data waited by the processor core.

Next, a case where the processor core 4 receives the data from the communication device 10 as the data to be stored in the cache memory 5 will be described. In such a case, the processor core 4 references a valid bit, and a dirty bit, and tag data of a cache line storing the received data. That is, the processor core 4 references the valid bit and the dirty bit of the cache line corresponding to the index of the memory address to store the received data. Then, in a case where the referenced valid bit is "0", or in a case where the referenced tag data is not matched with the tag data of the received memory address, the processor core 4 stores the received data in the memory 6.

Also, in a case where the referenced valid bit is "1" and the referenced tag data is matched with the tag of the memory address to store the received data, the processor core 4 performs the following processing. That is, the processor core 4 stores the data received from the communication device 10 in the cache line referencing state data and tag data.

The communication device 10 receives packetized data from another information processing apparatus, including the information processing apparatus 2a, through the bus 8. Here, data and a memory address of the memory 6 to store the data are stored in the packetized data. In a case where the data is received from another information processing apparatus 2a, the communication device 10 determines whether or not the received data is data waited by the processor core 4.

Then, in a case where it is determined that the received data is the data waited by the processor core 4, the communication device 10 transmits the data to the processor core 4 as the data to be stored in the cache memory 5. That is, the communication device 10 stores the received data in the cache memory 5 and the memory 6 by transmitting the data to the processor core 4 as the data to be stored in the cache memory 5.

On the other hand, in a case where it is determined that the received data is not the data waited by the processor core 4, the communication device 10 transmits the data to the processor core 4 as the data to be stored in the memory 6. That is, the communication device 10 stores the received data in the memory 6 by transmitting the data to the processor core 4 as the data to be stored in the memory 6.

Also, in a case where the data and the information indicating another information processing apparatus 2a of the transmission destination are received from the processor core 4, the communication device 10 packetizes the received data and transmits the packet to another information processing apparatus 2a of the transmission destination through the bus 8. In addition, in a case where the effect that the received data is data waited by the processor included in another information processing apparatus 2a is received from the processor core 4, the communication device 10 packetizes the received data and adds control information to the packet so as to indicate that the received data is subjected to the polling processing. Then, the communication device 10 transmits the packet, to which the control information is added, to another information processing apparatus 2a of the transmission destination.

Even in the example 1 of the third embodiment, in the communication device 10, in a case where "1 (valid)" is set as the padding flag in the padding information received through the determination unit 14, the padding addition unit 207 generates the padding-added data by adding the padding such that the data is aligned in an alignment size. The communication device 10 transmits the padding-added data to each processor core 4 as the data to be held in the cache memory 5 or the memory 6.

Also, in a case where "0 (invalid)" is set as the padding flag in the padding information, the padding addition unit 207 transmits the data received by the packet reception unit 208 to each processor core 4 as the data to be held in the cache memory 5 or the memory 6.

That is, the communication device 10a transmits the aligned data to the processor core 4.

Figure 11:
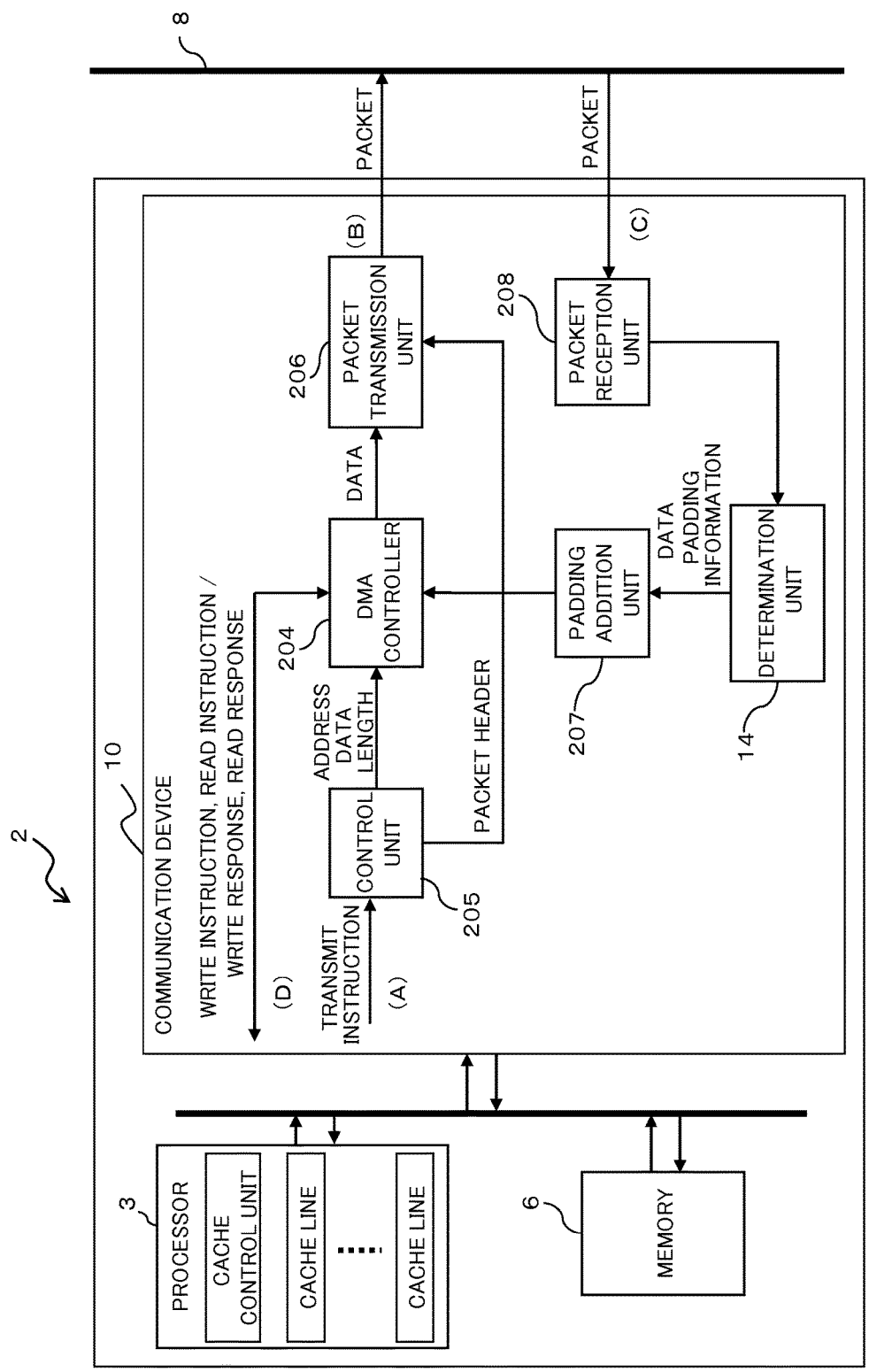
FIG. 11 is a diagram for describing an example of a communication device according to a parallel computer system as an example 1 of a third embodiment.

Hereinafter, an example of the communication device 10 will be described with reference to FIG. 11. FIG. 11 is a diagram for describing an example of the communication device according to the parallel computer system as the example 1 of the third embodiment. In the example illustrated in FIG. 10, the communication device 10 further includes the determination unit 14 in the communication device 10 of the first embodiment.

As illustrated in (A) of FIG. 11, in the case of transmitting the data waited by the processor core of another information processing apparatus 2a, the control unit 205 (packet generation unit) performs the following processing. That is, the control unit 205 packetizes the data to be transmitted, and stores, in the packet, the memory address or the like of another information processing apparatus 2a of the transmission destination or the memory included in another information processing apparatus 2a of the transmission destination storing the data. Also, the control unit 205 adds, to the packet, the control information to the effect that writes data to the cache memory included in the processor core of another information processing apparatus 2a. Then, the control unit 205 transmits the generated packet to the packet transmission unit 206.

Figure 12:
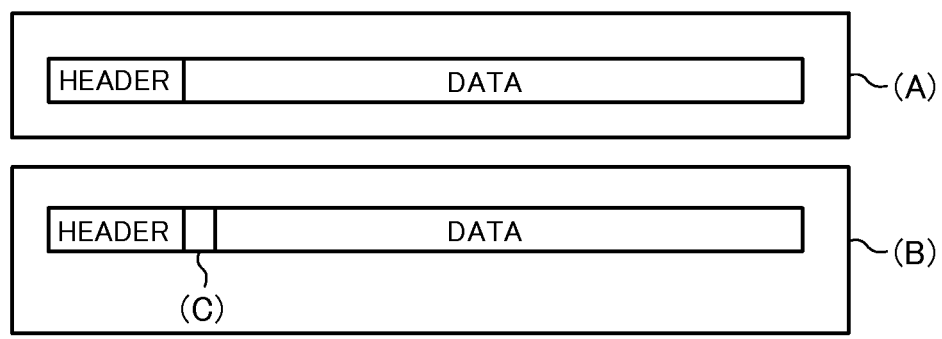
FIG. 12 is a diagram for describing an example of a packet generated by a control unit according to an example 1 of a third embodiment.

Here, FIG. 12 is a diagram for describing an example of the packet generated by the control unit 205 according to the example 1 of the third embodiment. As illustrated in (A) of FIG. 12, the packet of the related art includes a header part that stores an address indicating another information processing apparatus 2a of the transmission destination, and a data part that stores data. On the other hand, the control unit 205 generates a packet illustrated in (B) of FIG. 12. Specifically, as illustrated in (C) of FIG. 12, the control unit 205 adds a 1-bit flag region that stores the control information between the head of the packet and the data.

Then, in a case where the data to be transmitted is data waited by the processor core of another information processing apparatus 2a of the transmission destination, the control unit 205 stores "1" in the flag region as the control information. Also, in a case where the data to be transmitted is not data waited by the processor core of the information processing apparatus of the transmission destination, the control unit 205 stores "0" in the flag region as the control information. For the packet storing the above-described control information, it is assumed that not only the information processing apparatus 2 but also another information processing apparatus, including the information processing apparatus 2a, generate a similar packet.

Returning to FIG. 11, in a case where the packet generated by the control unit 205 is received, as illustrated in (B) of FIG. 11, the packet transmission unit 206 transmits the received packet to another information processing apparatus 2a of the transmission destination through the bus 8.

As illustrated in (C) of FIG. 11, in a case where the packet is received through the bus 8, the packet reception unit 208 transmits the received packet to the determination unit 14. The determination unit 14 determines whether or not "1" is stored in the flag region of the received packet.

Then, in a case where "1" is stored in the flag region of the packet, the determination unit 14 determines that the data stored in the packet is data to be stored in the cache memory 5. Also, in a case where "0" is stored in the flag region of the packet, the determination unit 14 determines that the data stored in the packet is data to be stored in the memory 6. After that, the determination unit 14 transmits the determined contents and the data stored in the packet to the padding addition unit 207.

The padding addition unit 207 generates padding-added data by adding padding to the data received by the packet reception unit 208. In a case where "1 (valid)" is set as the padding flag in the padding information received through the determination unit 14, the padding addition unit 207 generates the padding-added data by adding the padding such that the data is aligned in an alignment size. Then, the padding addition unit 207 transmits the generated padding-added data to the DMA controller 204 as the DMA write data.

Also, in a case where "1 (valid)" is not set as the padding flag in the padding information, the padding addition unit 207 transmits the data received by the packet reception unit 208 to the DMA controller 204 as the DMA write data.

In a case where the determination unit 14 determines that the data stored in the packet is the data to be stored in the cache memory 5, the DMA controller 204 (storage unit) performs the following processing. That is, as illustrated in (D) of FIG. 11, the DMA controller 204 transmits the DMA data transmitted from the padding addition unit 207 to the processor core 4 as the data to be stored in the cache memory 5 and the memory 6.

That is, in a case where the determination unit 14 determines that the data stored in the packet is the data to be stored in the memory 6, the DMA controller 204 transmits the DMA data transmitted from the padding addition unit 207 to the processor core 4 as the data to be stored in the memory 6.

Specifically, in a case where "1" is stored in the flag region of the packet, the DMA controller 204 transmits, to the processor core 4, the data received from the padding addition unit 207 and the notification of the effect that stores the data in the cache memory 5. Also, in a case where "0" is stored in the flag region of the packet, the DMA controller 204 transmits the data received from the padding addition unit 207 to the processor core 4. That is, the DMA controller 204 transmits, to the processor core 4, the data stored in the memory 6 and the data received from the padding addition unit 207.

Then, as described above, in a case where the data received by the packet reception unit 208 is not aligned, the padding addition unit 207 generates padding-added data by adding padding to the payload of the data. The communication device 10 transmits the padding-added data to the processor core 4.

Also, in a case where the data received by the packet reception unit 208 is aligned, the padding addition unit 207 transmits the data received from the packet reception unit 208 to the processor core 4.

That is, the communication device 10 transmits the aligned data to the processor core 4.

As described above, in the case of transmitting the data waited by the processor core included in another information processing apparatus 2a, that is, the data subjected to polling, the communication device 10 performs the following processing. That is, the communication device 10 stores "1" as the control information in the flag region of the packet to be transmitted, and transmits the packet to another information processing apparatus 2a of the transmission destination. Also, in the case of transmitting the data waited by the processor core 4, the communication device included in another information processing information, including the information processing apparatus 2a, also transmits the packet in which "1" is stored in the flag region.

Also, the communication device 10 stores the alignment size in the alignment size area of the data (packet) to be transmitted. Furthermore, in a case where the data to be transmitted is not aligned in an alignment size, the communication device 10 stores "1" in the padding flag region before transmission. Furthermore, in a case where the data to be transmitted is aligned in an alignment size, the communication device 10 stores "0" in the padding flag region before transmission.

Then, in a case where "1" is stored in the flag region of the received packet, the communication device 10 transmits the data stored in the received packet to the padding addition unit 207 as the data to be written to the cache memory 5.

In a case where "1" is stored in the padding flag, the padding addition unit 207 adds the padding matched with the alignment size to the received packet and transmits the packet to the DMA controller 204.

The DMA controller 204 transmits the packet received from the padding addition unit 207 to the processor core 4 as the data to be written to the cache memory 5.

In a case where data stored in a memory address to write the received data among the data stored in the memory 6 is cached into the cache memory 5, the processor core 4 caches the data received from the communication device 10 in the cache memory 5. Therefore, since the processor core 4 can read the waited data from the cache memory 5 instead of the memory 6, the arithmetic processing can be efficiently performed.

Also, at this time, since the DMA write data received by the processor core 4 is the aligned data, it is possible to reduce a latency when the data is stored in the cache memory 5.

On the other hand, in a case where "0" is stored in the flag region of the received packet, the communication device 10 transmits the data stored in the received packet to the padding addition unit 207 as the data to be written to the memory 6.

In a case where "1" is stored in the padding flag, the padding addition unit 207 adds the padding matched with the alignment size to the received packet and transmits the packet to the DMA controller 204.

The DMA controller 204 transmits the packet received from the padding addition unit 207 to the processor core 4 as the data to be written to the memory 6.

In such a case, the processor core 4 writes the data to the memory 6. That is, only when the data waited by the processor core 4 is received from another information processing apparatus 2a, the information processing apparatus 2 stores the data in the cache memory 5 included in the processor core 4 and stores the other data in the memory 6. Therefore, since it is possible to prevent the discharge of the data stored in the cache memory 5 and used in the arithmetic operation by the data whose use in the arithmetic operation is unclear, the parallel computer system 1 can prevent a computation processing speed from being reduced.

Also, at this time, since the DMA write data received by the processor core 4 is the aligned data, it is possible to reduce a latency when the data is stored in the cache memory 5.

For example, the processor 3, the processor core 4, the control unit 205, the packet transmission unit 206, the packet reception unit 208, the determination unit 14, the padding addition unit 207, and the DMA controller 204 are realized by integrated circuits such as LSI.

[Flow of Processing of Communication Device 10]

Figure 13:
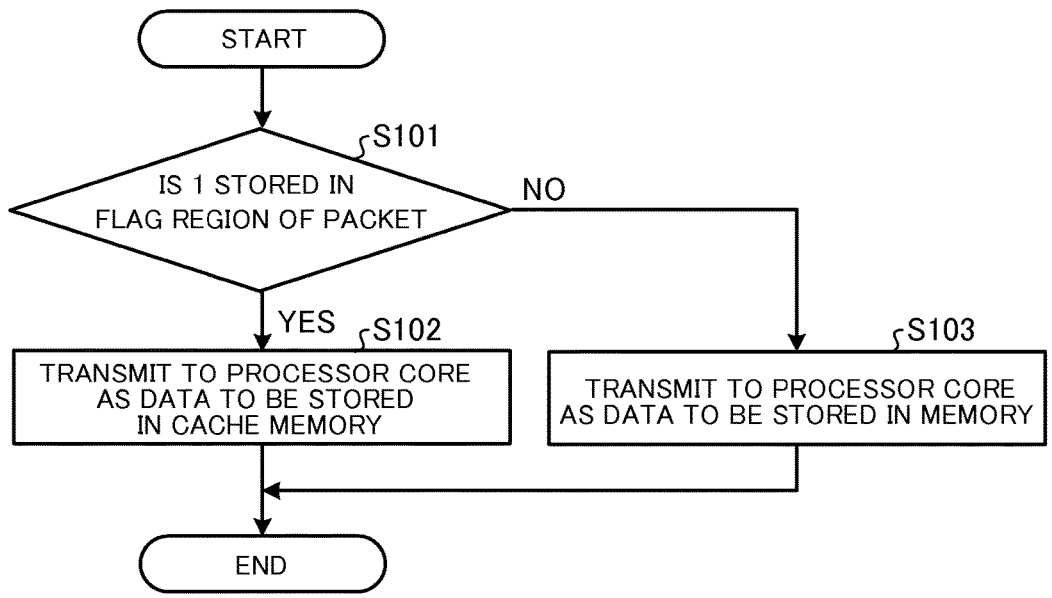
FIG. 13 is a flowchart for describing a flow of a process performed by a communication device according to an example 1 of a third embodiment.

Next, the flow of the processing performed by the communication device 10 will be described with reference to FIG. 13. FIG. 13 is a flowchart for describing the flow of the processing performed by the communication device according to the example 1 of the third embodiment. In the example illustrated in FIG. 13, the communication device 10 starts the processing by using the reception of the packet to be transmitted to the information processing apparatus 2 through the bus 8 as a trigger.

First, the communication device 10 determines whether or not "1" is stored in the flag region of the received packet (step S101). Then, in a case where "1" is stored in the flag region of the received packet (see YES route of step S101), the communication device 10 transmits data stored in the received packet to the processor core 4 as the data to be stored in the cache memory 5 (step S102). Also, at this time, in a case where "1" is stored in the padding flag, the padding addition unit 207 generates DMA write data by adding the padding matched with the alignment size to the received packet. The padding addition unit 207 transmits the generated DMA write data to the DMA controller 204, and the DMA controller 204 transmits the DMA write data to the processor core 4 as the data to be stored in the cache memory 5. In a case where "0" is stored in the padding flag, the padding addition unit 207 transmits the data stored in the received packet to the DMA controller 204 as the DMA write data, without adding the padding matched with the alignment size to the received packet. The DMA controller 204 transmits the DMA write data to the processor core 4 as the data to be stored in the cache memory 5.

On the other hand, in a case where "0" is stored in the flag region of the received packet (see NO route of step S101), the communication device 10 transmits data stored in the received packet to the processor core 4 as the data to be stored in the memory 6 (step S103). Then, the communication device 10 ends the processing. Also, at this time, in a case where "1" is stored in the padding flag, the padding addition unit 207 generates DMA write data by adding the padding matched with the alignment size to the received packet. The padding addition unit 207 transmits the generated DMA write data to the DMA controller 204, and the DMA controller 204 transmits the DMA write data to the processor core 4 as the data to be stored in the memory 6. In a case where "0" is stored in the padding flag, the padding addition unit 207 transmits the data stored in the received packet to the DMA controller 204 as the DMA write data, without adding the padding matched with the alignment size to the received packet. The DMA controller 204 transmits the DMA write data to the processor core 4 as the data to be stored in the memory 6.

[Effects of Example 1 of Third Embodiment]

As described above, in a case where the data is received from another information processing apparatus 2a, the information processing apparatus 2 determines whether or not the processor core 4 waits the received data. Then, in a case where it is determined that the processor core 4 waits the received data, the information processing apparatus 2 stores the received data in the cache memory 5. Also, in a case where it is determined that the processor core 4 does not wait the received data, the information processing apparatus 2 stores the received data in the memory 6 instead of the cache memory 5.

Therefore, when the processor core 4 receives data that is not used in the arithmetic operation, the information processing apparatus 2 prevents the discharge of the data stored in the cache memory 5. As a result, since the processor cores included in the respective information processing apparatuses 2 and 2a can efficiently perform the processing by using the data stored in the cache memory, the parallel computer system 1 can prevent the computation processing speed from being reduced.

Also, in the case of transmitting the data waited by the processor core included in another information processing apparatus, the respective information processing apparatuses 2 and 2a store the control information indicating the effect that the processor core waits in the packet to be transmitted. Then, in a case where the control information is stored in the received packet, the respective information processing apparatuses 2 and 2a store the data of the received packet in the cache memory 5. Also, in a case where the control information is not stored in the received packet, the respective information processing apparatuses 2 and 2a store the data of the received packet in the memory 6. Therefore, the respective information processing apparatuses 2 and 2a can easily determine whether or not to store the received data in the cache memory.

Then, the padding addition unit 207 generates the padding-added data by adding the padding to the payload in a case where it is determined that the padding flag is valid, with reference to the padding information added to the received data. The DMA controller 204 writes the padding-added data to the cache memory 5 or the memory 6. Therefore, even when the received data is not aligned, it is possible to shorten a latency when the data is written to the cache memory 5 or the memory 6.

(C-2) Example 2

Figure 14:
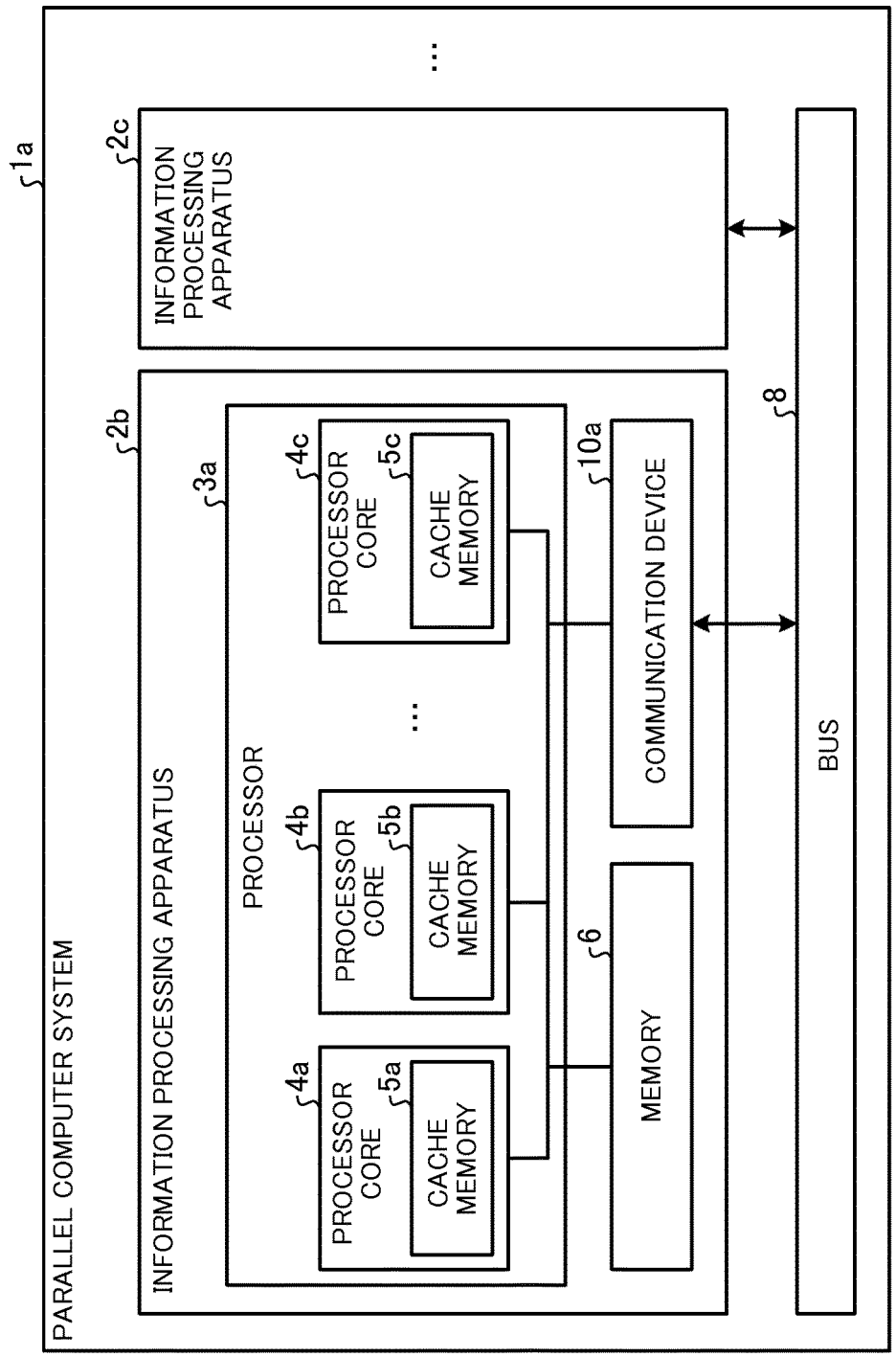
FIG. 14 is a diagram for describing an example of a parallel computer system according to an example 2 of a third embodiment.

In an example 2 of the third embodiment, a parallel computer system including a plurality of information processing apparatuses each of which is provided with a processor with a plurality of processor cores will be described. FIG. 14 is a diagram for describing an example of the parallel computer system according to the example 2 of the third embodiment. As illustrated in FIG. 14, the parallel computer system 1a includes a plurality of information processing apparatuses 2b and 2c. Since the information processing apparatus 2c performs the same processing as the information processing apparatus 2b, a description thereof will be omitted.

Also, among the respective units included in the information processing apparatus 2b, the units exhibiting the same function as the respective units included in the information processing apparatus 2 are assigned with the same reference signs, and a description thereof will be omitted.

The information processing apparatus 2b includes a processor 3a. Also, the processor 3a includes a plurality of processor cores 4a to 4c. The processor 3a may include an arbitrary number of processor cores. The processor cores 4a to 4c include cache memories 5a to 5c, respectively. Also, in the following description, the processor cores 4b and 4c exhibit the same function as the processor core 4a, and a description thereof will be omitted. Also, the cache memories 5b and 5c exhibit the same function as the cache memory 5a, and a description thereof will be omitted As in the cache memory 5 according to the example 1 of the third embodiment, the cache memory 5a includes state data, tag data, and a plurality of cache lines storing data. Here, the cache memory 5 stores identity information indicating the relationship among tag information, data stored in the same cache line, data stored in other cache memories 5b and 5c, and data stored in the memory 6.

For example, the cache memory 5 stores information indicating the state of the cache line based on MESI protocol (Illinois protocol) as state data. In detail, a case where "M:Modify" is stored in the state data indicates that the data stored in the same cache line is exclusively cached and the cached data is updated with the latest state by the processor core 4a.

Also, a case where "E:Exclusive" is stored in the state data indicates that the data stored in the same cache line is exclusively cached and the cached data is not updated by the processor core 4a. Also, in a case where "S:Shared" is stored in the state data indicates that other cache memories 5b and 5c cache the same shared data. Also, a case where "I:Invalid" is stored in the state data indicates that data of the same cache line are invalid.

In a case where the communication device 10a receives the data that is not waited by the respective processor cores 4a to 4c, the processor core 4a stores the received data in the memory 6. Also, in a case where the data received by the communication device 10a is data waited by the communication device 10a itself and data stored in the memory address to store the received data in the memory 6 is held in the cache memory 5a, the processor core 4a performs the following processing.

That is, the processor core 4a determines whether or not other processor cores 4b and 4c cache the data held in the cache memory 5a. When determined as held, the processor core 4a stores the received data in the memory 6. Also, in a case where it is determined that other processor cores 4b and 4c do not cache the data held in the cache memory 5a, the processor core 4a stores the received data in only the cache memory 5a.

Also, in a case where the data received by the communication device 10a is not aligned, the padding addition unit 207 sets the data as padding-added data by adding the padding to the payload and stores the padding-added data in the cache memories 5a, 5b, and 5c or the memory 6. Also, in a case where the data received by the communication device 10a is aligned, the data is stored in the cache memories 5a, 5b, and 5c or the memory 6 in an aligned state. That is, the aligned data is stored in the cache memories 5a, 5b, and 5c and the memory 6.

Next, an example of the processing performed by the processor core 4a will be described. For example, in a case where the data from the communication device 10a is received as the data to be stored in the memory 6, the processor core 4a performs the following processing. That is, the processor core 4a references the state data of the cache line corresponding to the index of the memory address of the memory 6 to store the received data in the cache memory 5a.

Then, in a case where "M" is stored in the referenced state data, the processor core 4a writes, to the memory 6, data stored in the same cache line as the referenced state data. Then, the processor core 4a updates the referenced state data from "M" to "I". After that, the processor core 4a stores the received data in the memory 6. Also, in a case where the referenced state data is other than "M", the processor core 4a updates the referenced state data to "I" and stores the received data to the memory 6. The data that is written to the memory 6 is the aligned data.

On the other hand, in a case where the data from the communication device 10a is received as the data to be stored in the cache memory, the processor core 4a performs the following processing. That is, the processor core 4a references the tag data and the state data of the cache line corresponding to the index of the memory address of the memory 6 to store the received data in the cache memory 5a.

Then, in a case where "I" is stored in the referenced state data, or in a case where the tag of the memory address to store the received data is not matched with the referenced tag data, the processor core 4a stores the received data in the memory 6. The data that is written to the memory 6 is also the aligned data.

Also, in a case where "S" is stored in the referenced state data and the tag of the memory address to store the received data is matched with the referenced tag data, the processor core 4a stores the received data in the memory 6 and updates the referenced state data from "S" to "I".

Also, in a case where the referenced state data is "M" or "E" and the tag of the memory address to store the received data is matched with the referenced tag data, the processor core 4a performs the following processing. That is, the processor core 4a stores the received data in the cache memory 5a and updates the referenced state data to "M". Also, the data that is written to the cache memory 5 is also the aligned data.

That is, in a case where data is received from the communication device 10a as the data to be stored in the cache memory, the respective processor cores 4a to 4c reference the tag data and the state data of the cache line corresponding to the index of the memory address to store the received data. Then, the respective processor cores 4a to 4c determines from the referenced state data and tag data whether or not the referenced data is data subjected to their own polling processing and the their own cache memories hold data stored in the memory address to store the received data. That is, the respective processor cores 4a to 4c determine whether or not the polling processing is performed on their own cache memory.

In a case where the packet is received from another information processing apparatus, including the information processing apparatus 2c, the communication device 10a determines whether or not "1" is stored in the flag region of the received packet. Then, in a case where "1" is stored in the flag region of the received packet, the communication device 10a performs the following processing. That is, the communication device 10a transmits the received data to the respective processor cores 4a to 4c as the data to be held in the cache memory. Also, at this time, in the communication device 10a, in a case where "1 (valid)" is set as the padding flag in the padding information received through the determination unit 14, the padding addition unit 207 generates the padding-added data by adding the padding such that the data is aligned in the alignment size. The communication device 10a transmits the padding-added data to the respective processor cores 4a to 4c as the data to be held in the cache memories 5a to 5c.

Also, in a case where "0 (invalid)" is set as the padding flag in the padding information, the padding addition unit 207 transmits the data received by the packet reception unit 208 to the respective processor cores 4a to 4c as the data to be held in the cache memories 5a to 5c.

On the other hand, in a case where "0" is stored in the flag region of the received packet, the communication device 10a transmits the received data to the respective processor cores 4a to 4c as the data to be stored in the memory 6. Also, at this time, in the communication device 10a, in a case where "1 (valid)" is set as the padding flag in the padding information received through the determination unit 14, the padding addition unit 207 generates the padding-added data by adding the padding such that the data is aligned in the alignment size. The communication device 10a transmits the padding-added data to the respective processor cores 4a to 4c as the data to be held in the memory 6.

Also, in a case where "0 (invalid)" is set as the padding flag in the padding information, the padding addition unit 207 transmits the data received by the packet reception unit 208 to the respective processor cores 4a to 4c as the data to be held in the memory 6.

Figure 15:
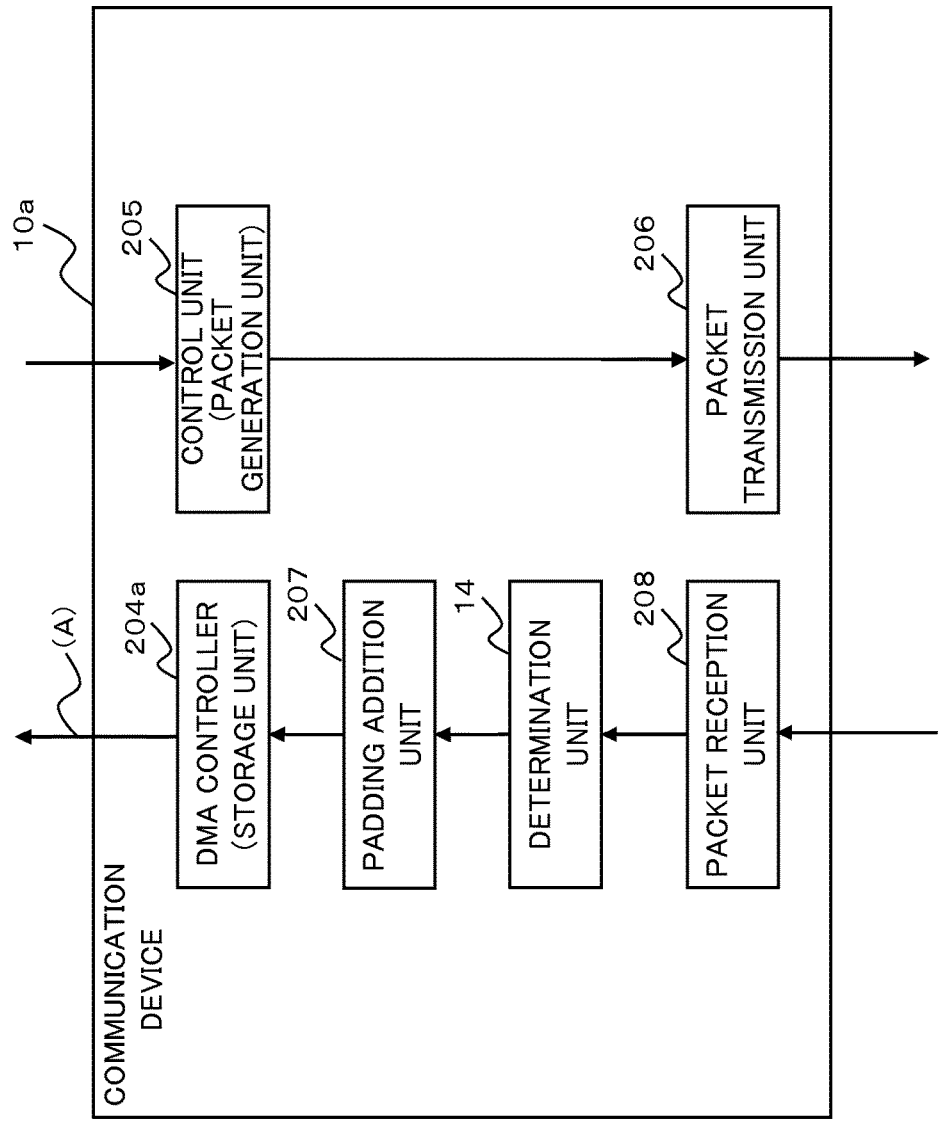
FIG. 15 is a diagram for describing a communication device according to an example 2 of a third embodiment.

Next, the respective units included in the communication device 10a will be described with reference to FIG. 15. FIG. 15 is a diagram for describing the communication device according to the example 2 of the third embodiment. In the example illustrated in FIG. 15, the communication device 10a includes a control unit 205 (packet generation unit), a packet transmission unit 206, a packet reception unit 208, a determination unit 14, a padding addition unit 207, and a DMA controller 204a (storage unit).

In a case where "1" is set as the padding flag in the padding information received through the determination unit 14, the padding addition unit 207 generates the padding-added data by adding the padding such that the data is aligned in the alignment size. The padding addition unit 207 transmits the generated padding-added data to the DMA controller 204.

Also, in a case where "0" is set to the padding flag in the padding information, the padding addition unit 207 transmits the data received by the packet reception unit 208 to the DMA controller 204.

In a case where the determination unit 14 determines that "1" is stored in the flag region of the packet, as illustrated in (A) of FIG. 15, the DMA controller 204a transmits the received data to the respective processor cores 4a to 4c as the data to be cached into the cache memories 5a to 5c. That is, in a case where the determination unit 14 determines that "1" is stored in the flag region of the packet, the DMA controller 204a stores the received data in the cache memory holding the data stored in the memory address of the memory 6 to store the received data.

Also, in a case where the determination unit 14 determines that "0" is stored in the flag region of the packet, as illustrated in (A) of FIG. 15, the DMA controller 204a transmits the received data to the respective processor cores 4a to 4c as the data to be stored in the memory 6. That is, in a case where the determination unit 14 determines that "0" is stored in the flag region of the packet, the DMA controller 204a transmits the received data in the memory 6.

[Effects of Example 2 of Third Embodiment]

As described above, the information processing apparatus 2b includes the processor 3a with the plurality of processor cores 4a to 4c. Also, the processor cores 4a to 4c include the cache memories 5a to 5c, respectively. In a case where the packet is received from another information processing apparatus, including the information processing apparatus 2c, the information processing apparatus 2b determines whether or not "1" is stored in the flag region of the received packet as the control information. In a case where "1" is stored as the control information, the information processing apparatus 2b stores the data of the received packet in the cache memory to cache the data stored in the memory address of the memory 6 to store the data of the received packet. Also, in a case where "0" is stored as the control information, the information processing apparatus 2b stores the data of the received packet in the memory 6.

Therefore, in a case where the data subjected to polling processing by the respective processor cores 4a to 4c is received, the information processing apparatus 2b can directly store the received data in the cache memories 5a to 5c. Therefore, even in a case where the processor 3a is a multi-core processor including a plurality of processor cores 4a to 4c, the information processing apparatus 2b can cause the processor 3a to efficiently perform the arithmetic processing.

Also, in a case where the data that is not subjected to polling processing by the respective processor cores 4a to 4c is received, the information processing apparatus 2b stores the received data in the memory 6. Therefore, the information processing apparatus 2b can prevent the data used in the arithmetic processing by the respective processor cores 4a to 4c from being discharged from the cache memories 5a to 5c by the received data. Therefore, the parallel computer system 1a can cause the processor 3a to perform efficient arithmetic processing, without reducing the computation processing speed.

Also, the respective cache memories 5a to 5c store identity information indicating the relationship among the data stored in the cache memories themselves, the data stored in other cache memories 5a to 5c, and the data stored in the memory 6. In a case where the data is received as the data to be stored in the cache memory, the respective processor cores 4a to 4c store identity information of the data cached in their own cache memories 5a to 5c and the data of the memory address to store the received data.

At this time, the respective processor cores 4a to 4c hold identity of the cached data and the data stored in the memory 6, based on the identity information stored in their own cache memories 5a to 5c. After that, the respective processor cores 4a to 4c store the data received from the communication device 10 in the cache memories 5a to 5c. Therefore, even in a case where the processor cores 4a to 4c include their own cache memories 5a to 5c, respectively, the parallel computer system 1a can hold coherence of data and perform appropriate arithmetic processing in the respective information processing apparatuses 2b and 2c.

Then, the padding addition unit 207 generates the padding-added data by adding the padding to the payload in a case where it is determined that the padding flag is valid, with reference to the padding information added to the received data. The DMA controller 204 writes the padding-added data to the cache memories 5a to 5c or the memory 6. Therefore, even when the received data is not aligned, it is possible to shorten a latency when the data is written to the cache memories 5a to 5c or the memory 6.

(C-3) Example 3

Figure 16:
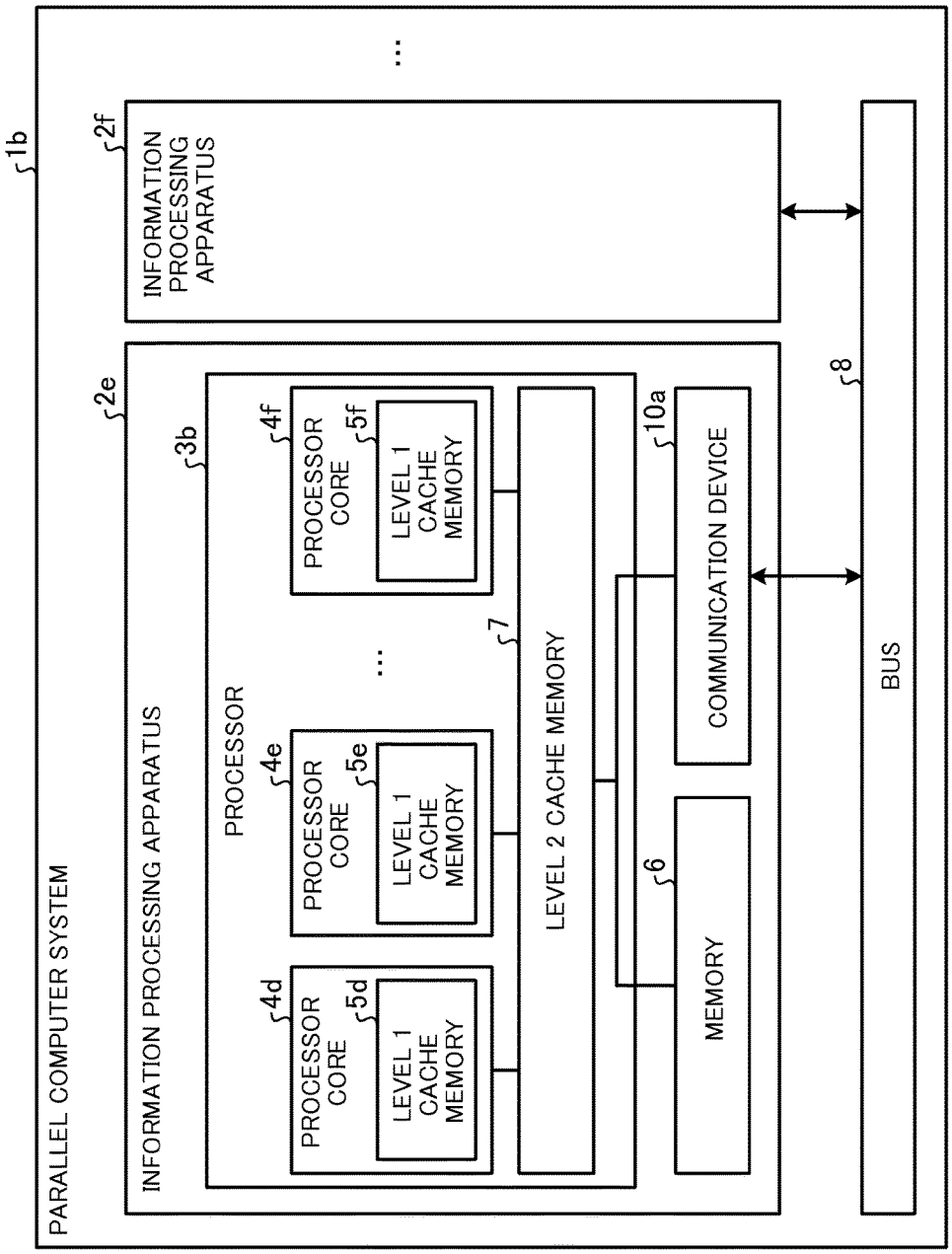
FIG. 16 is a diagram for describing an example of a parallel computer system according to an example 3 of a third embodiment.

In an example 3 of the third embodiment, a parallel computer system including a plurality of information processing apparatuses each of which is provided with a processor which includes plurality of processor cores with their own L1 cache memories and a single L2 cache memory shared by the respective processor cores will be described. FIG. 16 is a diagram for describing an example of the parallel computer system according to the example 3 of the third embodiment. As illustrated in FIG. 16, the parallel computer system 1b includes a plurality of information processing apparatuses 2e and 2f. Since the information processing apparatus 2f performs the same processing as the information processing apparatus 2e, a description thereof will be omitted.

Also, among the respective units included in the parallel computer system 1b, the units exhibiting the same function as the respective units included in the parallel computer system 1a are assigned with the same reference signs, and a description thereof will be omitted.

The information processing apparatus 2e includes a processor 3b. Also, the processor 3b includes a plurality of processor cores 4d to 4f and a level 2 cache memory 7 shared by the respective processor cores 4d to 4f. Also, the processor cores 4d to 4f include level 1 cache memories 5d to 5f, respectively. The respective processor cores 4e and 4f exhibit the same function as the processor core 4d, and a description thereof will be omitted.

Even in the example 3 of the third embodiment, in the communication device 10a, in a case where "1 (valid)" is set as the padding flag in the padding information received through the determination unit 14, the padding addition unit 207 generates the padding-added data by adding the padding such that the data is aligned in the alignment size. The communication device 10a transmits the padding-added data to the respective processor cores 4d to 4f as the data to be held in the level 1 cache memories 5d to 5f or the memory 6.

Also, in a case where "0 (invalid)" is set as the padding flag in the padding information, the padding addition unit 207 transmits the data received by the packet reception unit 208 to the respective processor cores 4d to 4f as the data to be held in the level 1 cache memories 5d to 5f or the memory 6.

That is, the communication device 10a transmits the aligned data to the processor cores 4d to 4f.

Each of the level 1 cache memories 5d to 5f includes a plurality of cache lines each having an alignment size of 64 bytes. Each of the level 1 cache memories 5d to 5f includes "2N1" cache lines and is a "2N1+6"-byte cache memory that stores "2"-bit state data, "34-N1"-bit tag data, and 64-byte data. Here, "N1" is a size of an index associated with each cache line of the level 1 cache memories 5d to 5f themselves.

It is assumed that information stored in the respective cache lines of the level 1 cache memories 5d to 5f is the same as information stored in the respective cache lines included in the cache memories 5a to 5c. Also, the state data stored in the respective cache lines of the level 1 cache memories 5d to 5f are the identity information indicating the following identity. That is, the state data indicates the identity of the data stored in the same cache line, the data stored in other level 1 cache memories 5d to 5f, and the data stored in the level 2 cache memory 7.

As in the level 1 cache memories 5d to 5f, the level 2 cache memory 7 includes "2N2" cache lines each storing 64-bit data. Also, the level 2 cache memory 7 is a "2N2+6"-byte cache memory that stores "2"-bit state data, "34-N2"-bit tag data, and 64-byte data. Here, "N2" is a size of an index associated with each cache line of the level 2 cache memory 7 itself. Also, the state data stored in each cache line of the level 2 cache memory 7 indicates the identity of the data stored in the same cache line and the data stored in the memory 6. Therefore, the data that is stored in the level 2 cache memory 7 is also the aligned data.

The respective level 1 cache memories 5d to 5f and the level 2 cache memory 7 are direct map type cache memories. For example, in a case where the data stored in the memory address "i" of the memory 6 is held, the respective level 1 cache memories 5d to 5f and the level 2 cache memory 7 hold the data in the cache line whose cache line number is "i".

In a case where the communication device 10a receives the data that is not waited by the respective processor cores 4d to 4f, the processor core 4d stores the received data in the memory 6. Also, in a case where the communication device 10a receives the data waited by the processor core 4d, the processor core 4d performs the following processing. That is, the processor core 4d determines whether the data stored in the storage area indicated by the memory address to store the received data in the memory 6 is cached into the level 1 cache memory 5d as the primary cache memory.

Then, in a case where it is determined that the data stored in the storage area of the memory 6 indicated by the memory address is held in the level 1 cache memory 5d, the processor core 4d caches the received data in the level 1 cache memory 5d. Also, the data that is written to the cache memory 5 is also the aligned data and it is possible to reduce a latency.

Also, in a case where it is determined that the data stored in the storage area of the memory 6 indicated by the memory address is not held in the level 1 cache memory 5d, the processor core 4d stores the received data in the memory 6. The data that is written to the memory 6 is also the aligned data and it is possible to reduce a latency.

Next, an example of the processing performed by the processor core 4d will be described. For example, in a case where the data from the communication device 10a is received as the data to be stored in the memory 6, the processor core 4d performs the following processing. That is, the processor core 4d references the state data stored in the cache line corresponding to the index of the memory address storing the received data in the level 1 cache memory 5d. Then, in a case where the referenced state data is "M", the processor core 4d writes the data of the same cache line as the referenced data to the memory 6 and updates the referenced state data to "I". Then, the processor core 4d stores the received data in the memory 6. The data that is written to the memory 6 is the aligned data.

On the other hand, in a case where the data from the communication device 10a is received as the data to be stored in the cache memories 5d to 5f, the processor core 4d performs the following processing. That is, the processor core 4d references the state data and the tag data in the cache line corresponding to the index of the memory address to store the received data. Then, in a case where "I" is stored in the referenced state data, or in a case where the referenced data is different from the tag of the memory address to store the received data, the processor core 4d stores the received data in the memory 6. The data that is written to the memory 6 is also the aligned data.

Also, in a case where "S" is stored in the referenced state data and the referenced tag data is matched with the tag of the memory address to store the received data, the processor core 4d stores the received data in the memory 6 and updates the referenced state data to "I". Also, in a case where "M" or "E" is stored in the referenced state data and the referenced tag data is matched with the tag of the memory address to store the received data, the processor core 4d performs the following processing. That is, the processor core 4d stores the received data in its own cache memory, that is, the level 1 cache memory 5d, and updates the referenced state data to "M". At this time, the processor core 4d does not store the received data in the memory 6. The data that is written to the cache memory 5d is the aligned data.

In a case where the received data is stored in the memory 6, prior to writing, the processor core 4d performs processing of holding coherence that is the consistency of data between the cache memories 5a to 5c and the main memory 6. That is, the processor core 4d references the state data and the tag data of the cache line corresponding to the index of the memory address to store the received data in the level 2 cache memory 7. Then, in a case where the referenced state data is "M", or in a case where the tag data is matched with the tag of the memory address to store the received data, the processor core 4d stores the data, which is stored in the same cache line as the referenced state data, in the memory 6. After that, the processor core 4d updates the referenced state data to "I", and further, stores the received data in the memory 6. The data that is written to the memory 6 is also the aligned data.

That is, in a case where the communication device 10a receives information subjected to polling processing by one of the processor cores 4d to 4f, the processor core 4d receives the received data as the data to be stored in the level 1 cache memory 5d. In such a case, the processor core 4d determines whether or not the data stored in the storage area of the memory 6 to store the received data is exclusively cached in the level 1 cache memory 5d. Then, in a case where the data stored in the storage area of the memory 6 to store the received data is exclusively cached in the level 1 cache memory 5d, the processor core 4d caches the received data in the level 1 cache memory 5d. Also, the data that written to the cache memory 5d is also the aligned data.

Generally, the processor core 4d caches the data of the memory address storing the data subjected to polling processing. Therefore, in a case where the data waited by the processor core 4d is received by the communication device 10a, the information processing apparatus 2e stores the received data in the level 1 cache memory 5d instead of the memory 6. As a result, the parallel computer system 1b can cause the respective information processing apparatuses 2e and 2f to perform efficient processing.

[Effects of Example 3 of Third Embodiment]

As described above, the information processing apparatus 2e includes the processor 3b with the plurality of processor cores 4d to 4f. Also, the processor cores 4d to 4f include level 1 cache memories 5d to 5f, respectively. In a case where the packet is received from another information processing apparatus, including the information processing apparatus 2f, the information processing apparatus 2e determines whether or not "1" is stored in the flag region of the received packet as the control information.

In a case where "1" is stored as the control information, the information processing apparatus 2e stores the received data in the level 1 cache memories 5d to 5f to cache the data of the memory address to store the received data. Also, in a case where "0" is stored as the control information, the information processing apparatus 2e stores the data of the received packet in the memory 6.

Therefore, in a case where the data subjected to polling processing by the respective processor cores 4d to 4f is received, the information processing apparatus 2e can directly store the received data in the level 1 cache memories 5d to 5f. Therefore, the information processing apparatus 2e can cause the processor 3b to efficiently perform the arithmetic operation.

Also, in a case where the data that is not subjected to polling processing by the respective processor cores 4d to 4f is received, the information processing apparatus 2e stores the received data in the memory 6. Therefore, the information processing apparatus 2e can prevent the data used in the arithmetic processing by the respective processor cores 4d to 4f from being discharged from the level 1 cache memories 5d to 5f by the received data. Therefore, the parallel computer system 1b can perform efficient arithmetic processing, without reducing the computation processing speed.

Also, the respective level 1 cache memories 5d to 5f store first identity information indicating the relationship among the data stored in the level 1 cache memories 5d to 5f themselves, the data stored in other level 1 cache memories 5d to 5f, and the data stored in the level 2 cache memory 7. Also, the level 2 cache memory 7 stores second identity information that is state data indicating the relationship between the data cached in the level 2 cache memory 7 itself and the data cached in the memory 6. The respective processor cores 4d to 4f hold the identity of the data stored in the level 1 cache memories 5d to 5f, the data stored in the level 2 cache memory 7, and the data stored in the memory 6, based on the first identity information and the second identity information.

Therefore, even in a case where the processor cores 4d to 4f include their own level 1 cache memories 5d to 5f, respectively, and share the level 2 cache memory 7, the parallel computer system 1b can hold appropriately hold the identity of data and perform appropriate arithmetic processing.

Then, the padding addition unit 207 generates the padding-added data by adding the padding to the payload in a case where it is determined that the padding flag is valid, with reference to the padding information added to the received data. The DMA controller 204 writes the padding-added data to the level 1 cache memories 5d to 5f or the memory 6. Therefore, even when the received data is not aligned, it is possible to shorten a latency when the data is written to the level 1 cache memories 5d to 5f or the memory 6.

(C-4) Example 4

Figure 17:
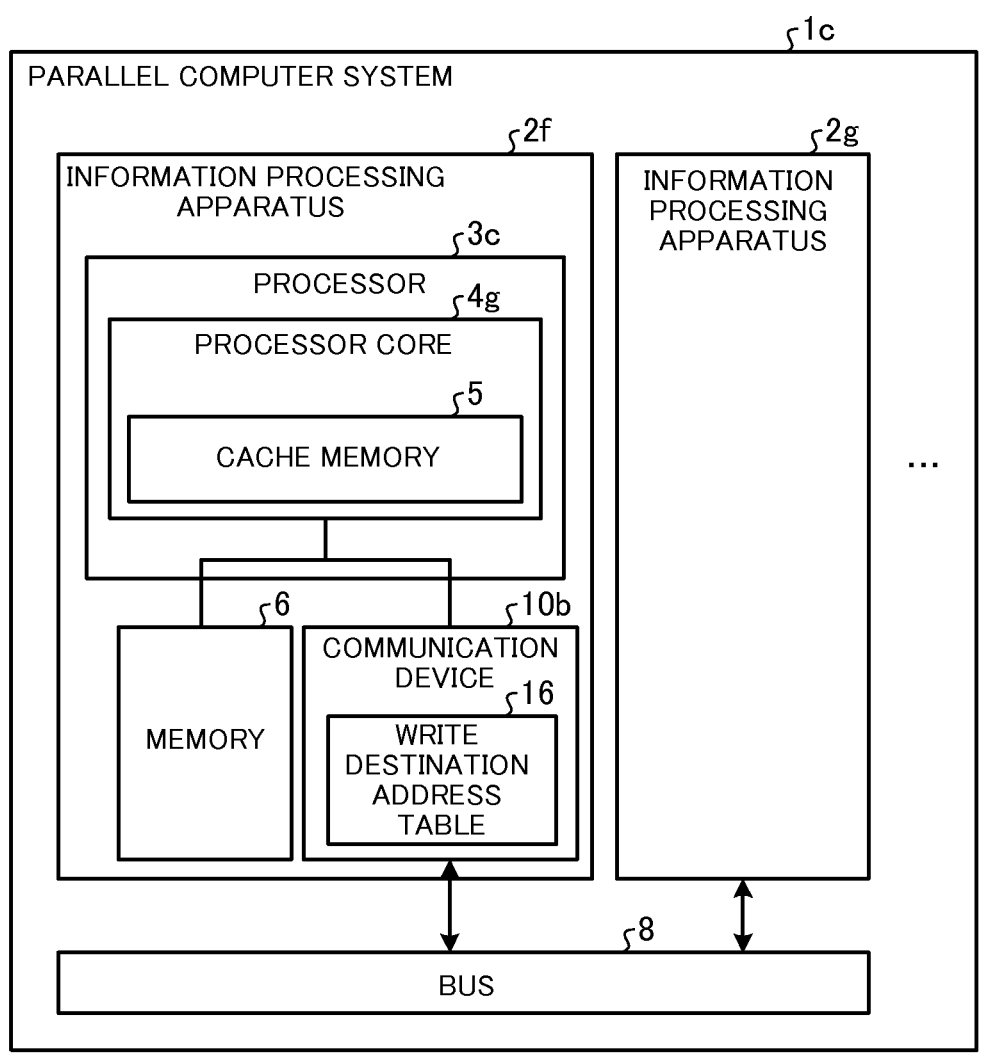
FIG. 17 is a diagram for describing a parallel computer system according to an example 4 of a third embodiment.

In an example 4 of the third embodiment, an example of the parallel computer system will be described with reference to FIG. 17. FIG. 17 is a diagram for describing the parallel computer system according to the example 4 of the third embodiment. As illustrated in FIG. 17, the parallel computer system 1c includes a plurality of information processing apparatuses 2f and 2g. Although not illustrated in FIG. 17, the parallel computer system 1c further includes a plurality of information processing apparatuses. Also, since the information processing apparatus 2g performs the same processing as the information processing apparatus 2f, a description thereof will be omitted. Also, the same reference signs are assigned to the units that perform the same processing as those of the first to third embodiments and the examples 1 to 4 of the third embodiment described above, and a description thereof will be omitted.

The information processing apparatus 2f includes a processor 3c, a memory 6, and a communication device 10b. The processor 3c includes a processor core 4g. The processor core 4g includes a cache memory 5. Also, the communication device 10b includes a write destination address table 16.

The processor core 4g performs the same processing as the processor core 4 according to the example 1 of the third embodiment. That is, in a case where the data from the communication device 10b is received as the data to be stored in the memory 6, the processor core 4g performs the same processing as the processor core 4 and discharges the received data in the memory 6. Also, in a case where the data from the communication device 10b is received as the data to be stored in the cache memory 5, the processor core 4g performs the same processing as the processor core 4 and stores the received data in the cache memory 5. Therefore, the description of the processing of storing the data in the cache memory 5 and the memory 6 by the processor core 4g will be omitted.

Furthermore, in a case where the polling processing of waiting the received data is performed, immediately before, the processor core 4g registers the memory address of the memory 6 to store the data subjected to polling processing, in the write destination address table 16 of the communication device 10b. Specifically, the processor core 4g transmits the memory address of the memory 6 to store the data subjected to polling processing to the communication device 10b and causes the update unit 17 of the communication device 10b, which is to be described below, to store the transmitted memory address in the write destination address table 16.

Also, in a case where the data subjected to the polling processing is received from the communication device 10c and the received data is stored in the data cache memory 5, the processor core 4g notifies to the communication device 10c that the data subjected to the polling processing is stored in the cache memory 5. For example, the processor core 4g transmits the memory address of the memory 6 to store the data stored in the cache memory 5 to the communication device 10b, together with the effect that the data subjected to the polling processing is stored in the cache memory 5.

The communication device 10b includes the write destination address table 16 that holds a control address controlling a data write to the cache memory 5. Then, in a case where the write destination address of the data received from another information processing apparatus, including the information processing apparatus 2g, is matched with the control address held in the write destination address table 16, the communication device 10b performs the following processing. That is, the communication device 10b transmits the received data to the processor core 4g as the data to be stored in the cache memory 5.

Also, in a case where the write destination address of the received data is not matched with the control address held in the write destination address table 16, the communication device 10b transmits the received data to the processor core 4g as the data to be stored in the memory 6.

Also, in a case where the notification of the effect that the data subjected to the polling processing is stored in the cache memory 5 is received from the processor core 4g, the communication device 10b performs the following processing. That is, the communication device 10b deletes the memory address of the memory 6 to store the data stored in the cache memory 5 from the write destination address table 16.

For example, the communication device 10b receives, from the processor core 4g, the memory address of the memory 6 to store the data stored in the cache memory 5 together with the effect that the data subjected to the polling processing is stored in the cache memory 5. In such a case, the communication device 10b searches the received memory address from the write destination address table 16 and deletes the searched memory address from the write destination address table 16.

Also, even in the example 4 of the third embodiment, in the communication device 10b, in a case where "1 (valid)" is set as the padding flag in the padding information received through the determination unit 14, the padding addition unit 207 generates the padding-added data by adding the padding such that the data is aligned in the alignment size. The communication device 10b transmits the padding-added data to each processor core 4g as the data to be held in the cache memory 5 or the memory 6.

Also, in a case where "0 (invalid)" is set as the padding flag in the padding information, the padding addition unit 207 transmits the data received by the packet reception unit 208 to each processor core 4g as the data to be held in the cache memory 5 or the memory 6.

That is, the communication device 10b transmits the aligned data to the processor core 4g.

Figure 18:
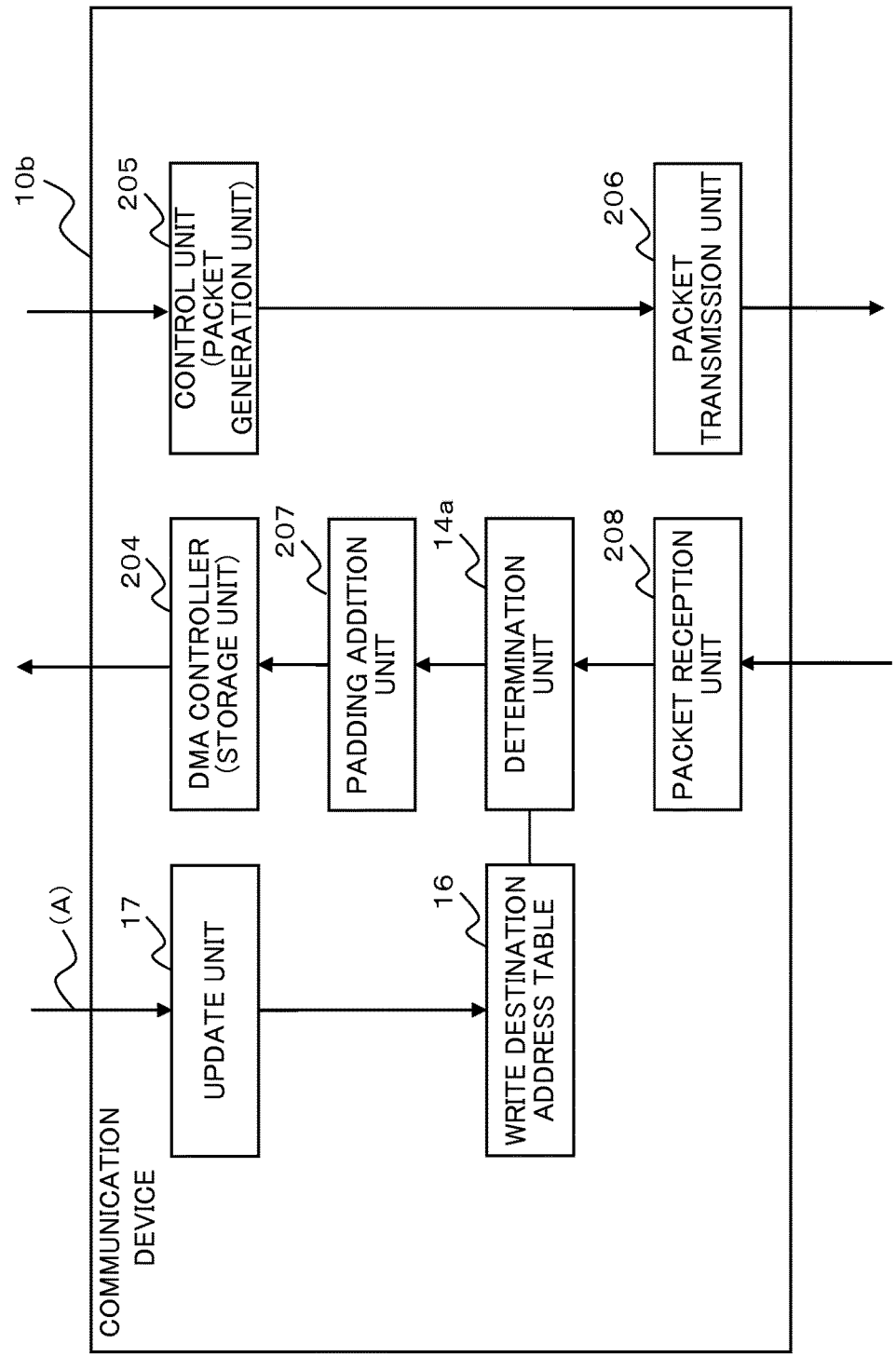
FIG. 18 is a diagram for describing an example of a communication device according to an example 4 of a third embodiment.

Hereinafter, the communication device 10b will be described with reference to FIGS. 18 and 19. First, the respective units included in the communication device 10b will be described with reference to FIG. 18. FIG. 18 is a diagram for describing an example of the communication device according to an example 4 of the third embodiment. As illustrated in FIG. 18, the communication device 10b includes a control unit 205 (packet generation unit), a packet transmission unit 206, a packet reception unit 208, a determination unit 14a, a DMA controller 204 (storage unit), a write destination address table 16, an update unit 17, and a padding addition unit 207.

The write destination address table 16 holds the memory address at which data subjected to the polling processing of the processor core 4g is stored. Here, FIG. 19 is a diagram for describing an example of the write destination address table. In the example illustrated in FIG. 19, the write destination address table 16 includes N line memories of line numbers "0" to "N−1" which store memory addresses.

Figure 19:
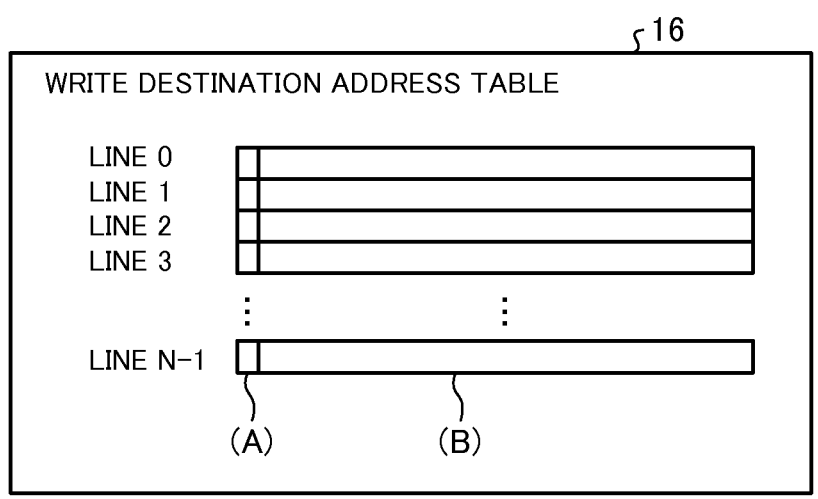
FIG. 19 is a diagram for describing an example of a write destination address table.

Each of the line memories stores a valid bit in a 1-bit region illustrated in (A) of FIG. 19, and stores a memory address in a 64-bit range illustrated in (B) of FIG. 19. Here, the valid bit is a bit that indicates whether or not the memory address stored in the line memory is valid data. For example, a case where "0" is stored in the valid bit indicates that the data of the memory address stored in the line memory is invalid. Also, a case where "1" is stored in the valid bit indicates that the data of the memory address stored in the line memory is valid. The write destination address table 16 is a semiconductor memory element, such as a random access memory (RAM), a read only memory (ROM), and a flash memory.

In a case where the packet is received from the packet reception unit 208, the determination unit 14a acquires the memory address of the memory 6 to store the data stored in the received packet. Also, the determination unit 14a determines whether or not the same memory address as the acquired memory address is stored in the write destination address table 16.

That is, the determination unit 14a compares the memory address stored in the line memory, in which "1" is stored in the valid bit, with the acquired memory address in each line memory included in the write destination address table 16. Then, in a case where the memory address stored in the line memory, in which "1" is stored in the valid bit, is matched with the acquired memory address, the determination unit 14a determines that the data stored in the received packet is the data to be stored in the cache memory 5. On the other hand, in a case where the memory address stored in the line memory, in which "1" is stored in the valid bit, is not matched with the acquired memory address, the determination unit 14a determines that the data stored in the received packet is the data to be stored in the memory 6.

As illustrated in (A) of FIG. 18, in a case where the memory address of the memory 6 to store the data subjected to the polling processing is received from the processor core 4g, the update unit 17 adds the received memory address to the write destination address table 16. Also, in a case where the notification of the effect that the data subjected to the polling processing has been acquired is received from the processor core 4g, the update unit 17 deletes the memory address of the memory 6, which store the data subjected to the polling processing, from the write destination address table 16.

For example, in a case where the memory address of the memory 6, which stores the data subjected to the polling processing, is received from the processor core 4g, the update unit 17 selects the line memory, of which the valid bit is "0", in each line memory included in the write destination address table 16. Then, the update unit 17 stores the memory address received from the processor core 4g in the selected line memory, and updates the valid bit of the selected line memory to "1".

Also, in a case where the memory address of the memory 6 to store the data stored in the cache memory 5 is received from the processor core 4g together with the effect that the data subjected to the polling processing is stored in the cache memory 5, the update unit 17 performs the following processing. That is, the update unit 17 searches a line memory of which the valid bit is "1" and in which the address received from the processor core 4g is stored, among the line memories included in the write destination address table 16. Then, the update unit 17 updates the valid bit of the searched line memory to "0". The update unit 17 is an electronic circuit. Here, as an example of the electronic circuit, an integrated circuit such as an application specific integrated circuit (ASIC) or a field programmable gate array (FPGA), a central processing unit (CPU), or a micro processing unit (MPU) is applied.

[Flow of Processing of Communication Device 10b]

Figure 20:
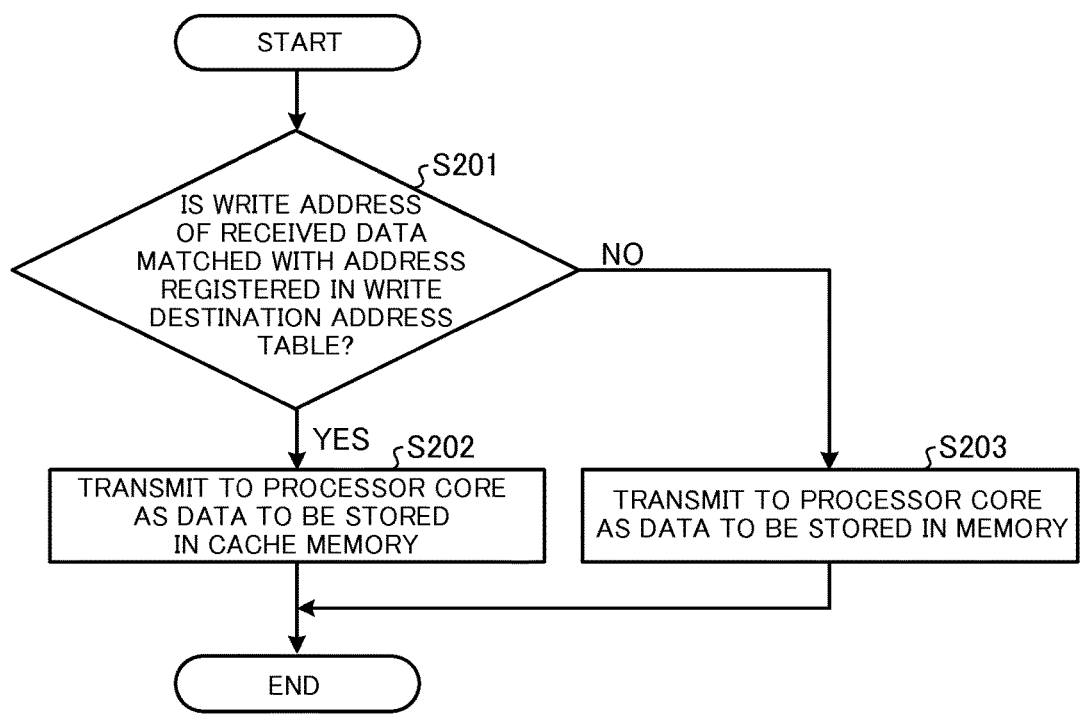
FIG. 20 is a flowchart for describing a flow of a process performed by a communication device according to an example 4 of a third embodiment.

Next, the flow of the processing performed by the communication device 10b will be described with reference to FIG. 20. FIG. 20 is a flowchart for describing the flow of the processing performed by the communication device according to the example 4 of the third embodiment. In the example illustrated in FIG. 20, the communication device 10b starts the processing by using the reception of the packet to be transmitted to the information processing apparatus 2f through the bus 8 as a trigger.

First, the communication device 10b determines whether or not the write destination address of the data stored in the received packet is matched with the memory address stored in the write destination address table 16 (step S201). That is, the communication device 10*b* determines whether or not the memory address of the memory 6 storing the received data is registered in the write destination address table 16.

Then, in a case where the write destination address of the data stored in the received packet is matched with the memory address stored in the write destination address table 16 (see YES route of step S201), the communication device 10*b* performs the following processing. That is, the communication device 10*b* transmits the data of the received packet to the processor core 4*g* as the data to be stored in the cache memory 5 (step S202). Also, at this time, in a case where "1" is stored in the padding flag, the padding addition unit 207 generates DMA write data by adding the padding matched with the alignment size to the received packet. The padding addition unit 207 transmits the generated DMA write data to the DMA controller 204, and the DMA controller 204 transmits the DMA write data to the processor core 4 as the data to be stored in the cache memory 5. In a case where "0" is stored in the padding flag, the padding addition unit 207 transmits the data stored in the received packet to the DMA controller 204 as the DMA write data, without adding the padding matched with the alignment size to the received packet. The DMA controller 204 transmits the DMA write data to the processor core 4 as the data to be stored in the cache memory 5.

On the other hand, in a case where the write destination address of the data stored in the received packet is not matched with the memory address stored in the write destination address table 16 (see NO route of step S201), the communication device 10*b* performs the following processing. That is, the communication device 10*b* transmits the data of the received packet to the processor core 4*g* as the data to be stored in the memory 6 (step S203). After that, the communication device 10*b* ends the processing. Also, at this time, in a case where "1" is stored in the padding flag, the padding addition unit 207 generates the DMA write data by adding the padding matched with the alignment size to the received packet. The padding addition unit 207 transmits the generated DMA write data to the DMA controller 204, and the DMA controller 204 transmits the DMA write data to the processor core 4 as the data to be stored in the memory 6. In a case where "0" is stored in the padding flag, the padding addition unit 207 transmits the data stored in the received packet to the DMA controller 204 as the DMA write data, without adding the padding matched with the alignment size to the received packet. The DMA controller 204 transmits the DMA write data to the processor core 4 as the data to be stored in the memory 6.

[Effects of Example 4 of Third Embodiment]

As described above, the information processing apparatus 2*f* includes the write destination address table 16 that holds the memory address storing the data subjected to the polling processing by the processor core 4*g*. In addition, in a case where the processor core 4*g* performs the polling processing, the information processing apparatus 2*f* stores the memory address, at which the data subjected to the polling processing is stored, in the write destination address table 16.

In a case where the packet is received from another information processing apparatus, including the information processing apparatus 2*g*, the information processing apparatus 2*f* determines whether or not the memory address storing the received data is stored in the write destination address table 16. Also, in a case where it is determined that the memory address storing the received data is stored in the write destination address table 16, the information processing apparatus 2*f* stores the received data in the cache memory 5. Also, in a case where it is determined that the memory address storing the received data is not stored in the write destination address table 16, the information processing apparatus 2*f* stores the received data in the memory 6.

Therefore, when the processor core 4*g* receives data that is not used in the arithmetic operation, the information processing apparatus 2*f* prevents the discharge of the data stored in the cache memory 5. As a result, since the processor cores included in the respective information processing apparatuses 2*f* and 2*g* can efficiently perform the processing by using the data stored in the cache memory, the parallel computer system 1*c* can prevent the computation processing speed from being reduced.

Then, the padding addition unit 207 generates the padding-added data by adding the padding to the payload in a case where it is determined that the padding flag is valid, with reference to the padding information added to the received data. The DMA controller 204 writes the padding-added data to the cache memory 5 or the memory 6. Therefore, even when the received data is not aligned, it is possible to shorten a latency when the data is written to the cache memory 5 or the memory 6.

(C-5) Example 5

Figure 21:
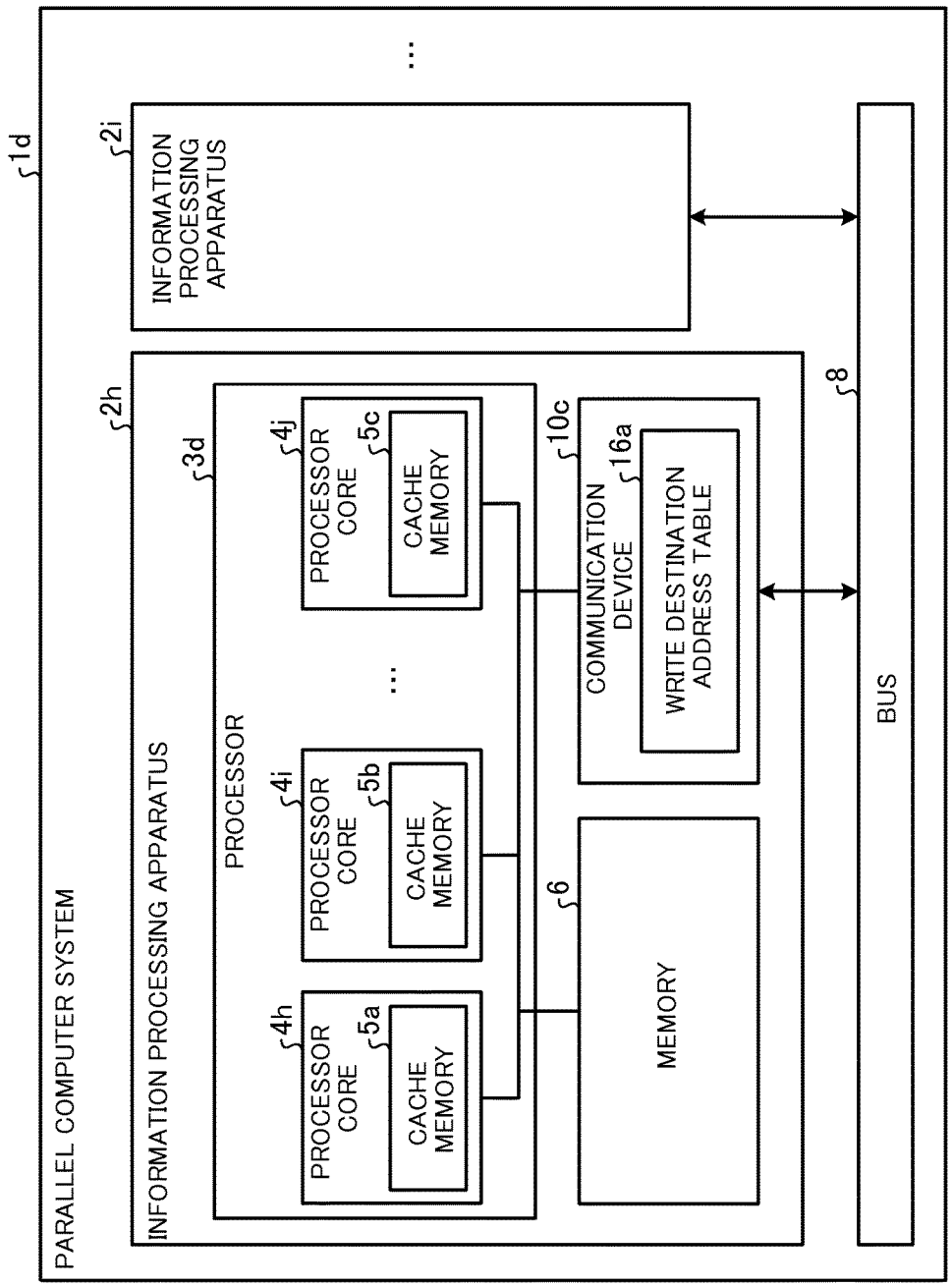
FIG. 21 is a diagram for describing an example of a parallel computer system according to an example 5 of a third embodiment.

In an example 5 of the third embodiment, a parallel computer system 1*d* including a plurality of information processing apparatuses each of which is provided with a processor with a plurality of processor cores will be described. FIG. 21 is a diagram for describing an example of the parallel computer system according to the example 5 of the third embodiment. As illustrated in FIG. 21, the parallel computer system 1*d* includes a plurality of information processing apparatuses, including information processing apparatuses 2*h* and 2*i*. Since each information processing apparatus, including the information processing apparatus 2*i*, performs the same processing as the information processing apparatus 2*h*, a description thereof will be omitted. Also, among the respective units included in the information processing apparatus 2*h*, the units performing the same processing as the respective units included in the information processing apparatus 2*b* are assigned with the same reference signs, and a description thereof will be omitted.

The information processing apparatus 2*h* includes a processor 3*d* with a plurality of processor cores 4*h* to 4*j*, a memory 6, and a communication device 10*c*. The processor cores 4*h* to 4*j* include cache memories 5*a* to 5*c*, respectively. Also, the communication device 10*c* includes a write destination address table 16*a*.

As in the processor core 4*a* according to the example 2 of the third embodiment, in a case where the data to be stored in the memory 6 is received from the communication device 10*c*, the processor core 4*h* stores the received data in the memory 6. Also, in a case where the data to be stored in the cache memory 5*a* is received from the communication device 10*c*, the processor core 4*h* stores the received data in the cache memory 5*a*.

Also, in a case where the received data is stored in the cache memory 5*a* or the memory 6, the processor core 4*h* performs the following processing. That is, as in the processor core 4*a*, the processor core 4*h* holds coherence of the data stored in the cache memory 5*a* and the data stored in the memory 6, based on the identity information stored in the cache memory 5*a*.

Specifically, the processor core 4h holds the identity of the data stored in the cache memory 5a and the memory 6 according to the state data stored in the respective cache lines included in the cache memory 5a. After that, the processor core 4h stores the received data in the cache memory 5a or the memory 6. Since detailed processing in which the processor core 4h holds the identity of the data stored in the cache memory 5a and the memory 6 are the same as the processing performed by the processor core 4a, a description thereof will be omitted.

Furthermore, as in the processor core 4g according to the example 4, in a case where the polling processing is performed, immediately before, the processor core 4h registers the write destination address of the data subjected to the polling processing in the write destination address table 16 of the communication device 10c. At this time, the processor core 4h registers write destination cache memory identification information indicating its own cache memory 5a in association with the memory address, together with the write destination address.

The communication device 10c includes a write destination address table 16a that holds the memory address storing the received data and the write destination cache memory identification information identifying the respective cache memories 5a to 5c in association with each other. As in the communication device 10b according to the example 4, in a case where the packet is received from another information processing apparatus, including the information processing apparatus 2i, the communication device 10c performs the following processing. That is, the communication device 10c determines whether or not the same memory address as the memory address storing the received packet is stored in the write destination address table 16a.

Then, in a case where the same memory address as the memory address storing the received packet is stored in the write destination address table 16a, the communication device 10c performs the following processing. That is, the communication device 10c determines a processor core including a cache memory indicated by the write destination cache memory identification information associated with the same memory address as the memory address storing the received packet. Then, the communication device 10c transmits the received data to the determined processor core as the data to be stored in the cache memory.

On the other hand, in a case where the same memory address as the memory address storing the received packet is not stored in the write destination address table 16a, the communication device 10c transmits the received data to the respective processor cores 4h to 4j as the data to be stored in the memory 6.

Figure 22:
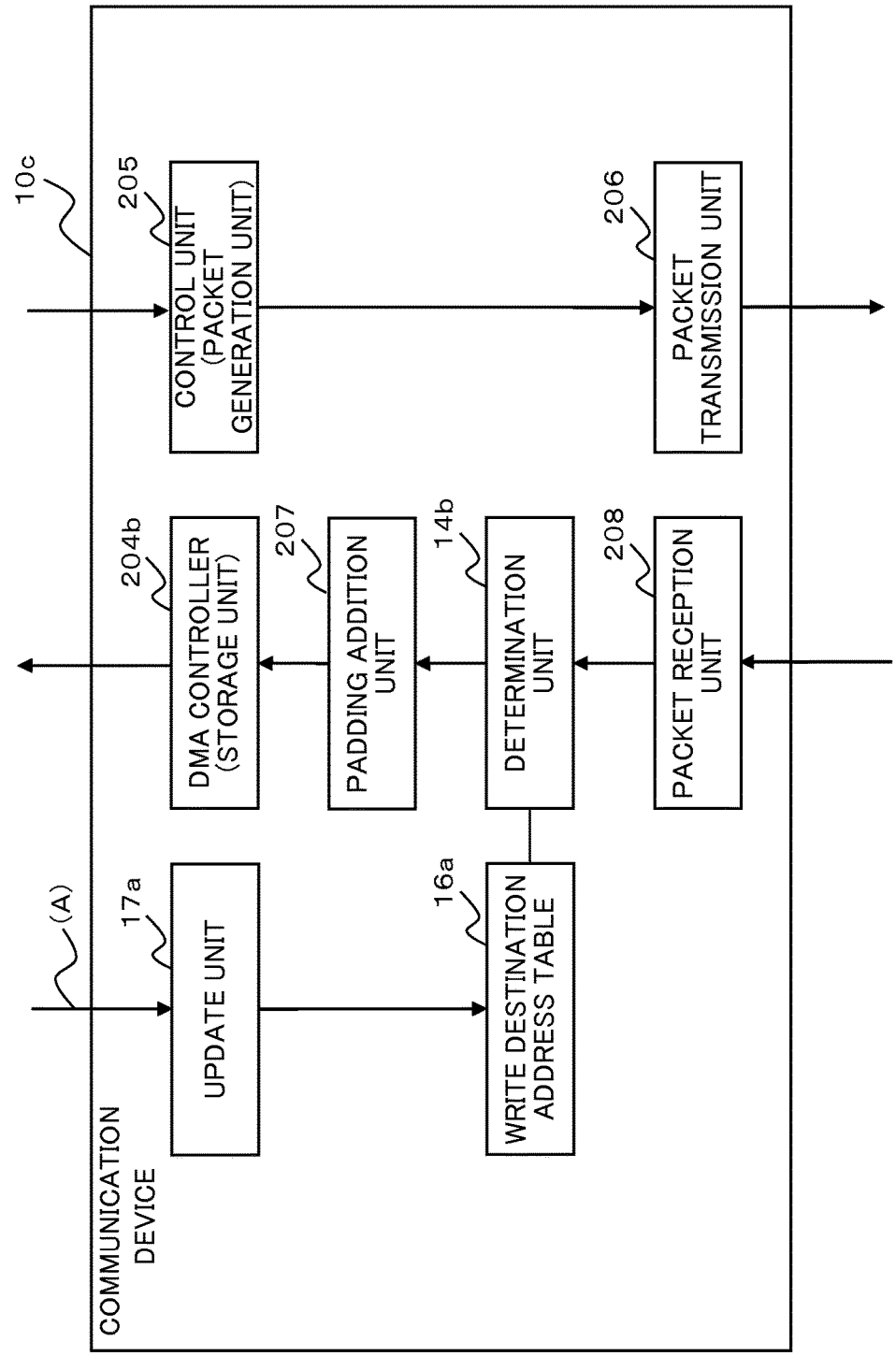
FIG. 22 is a diagram for describing an example of a communication device according to an example 5.

Next, the respective units included in the communication device 10c will be described with reference to FIG. 22. FIG. 22 is a diagram for describing an example of the communication device according to the example 5. Among the respective units included in the communication device 10c, the units performing the same processing as the respective units included in the examples 1 to 4 are assigned with the same reference signs, and a description thereof will be omitted.

As illustrated in FIG. 22, the communication device 10c includes a DMA controller 204b (storage unit), a determination unit 14b, a write destination address table 16a, an update unit 17a, a control unit 205, a packet transmission unit 206, and a padding addition unit 207.

Even in the example 5 of the third embodiment, in the communication device 10c, in a case where "1 (valid)" is set as the padding flag in the padding information received through the determination unit 14, the padding addition unit 207 generates padding-added data by adding padding such that the data is aligned in an alignment size. The communication device 10c transmits the padding-added data to the respective processor cores 4h to 4j as the data to be held in the cache memories 5a to 5c or the memory 6.

Also, in a case where "0 (invalid)" is set as the padding flag in the padding information, the padding addition unit 207 transmits the data received by the packet reception unit 208 to the respective processor cores 4d to 4f as the data to be held in the cache memories 5a to 5c or the memory 6.

That is, the communication device 10c transmits the aligned data to the processor cores 4d to 4f.

As in the write destination address table 16 according to the example 4 of the third embodiment, the write destination address table 16a holds the memory address storing the data subjected to the polling processing. Furthermore, the write destination address table 16a holds the write destination cache memory identification information, which identifies the cache memory included in the processor core performing the polling processing, in the held memory address in association with each other.

For example, the write destination address table 16a includes a plurality of line memories in which a storage area storing the write destination cache memory identification information is further added to each line memory included in the write destination address table 16. Then, the write destination address table 16a stores the associated memory address and the write destination cache memory identification information in the same line memory.

The determination unit 14b acquires the memory address of the memory 6 storing the data stored in the packet received by the packet reception unit 208. Then, the determination unit 14b determines whether or not the same memory address as the acquired memory address is stored in the write destination address table 16a.

Then, in a case where the same memory address as the acquired memory address is stored in the write destination address table 16a, the determination unit 14b performs the following processing. That is, the determination unit 14b acquires the write destination cache memory identification information stored in association with the memory address stored in the write destination address table 16a. Then, the determination unit 14b determines whether the data stored in the received packet is the data to be stored in the cache memory indicated by the acquired write destination cache memory identification information.

On the other hand, in a case where the same memory address as the acquired memory address is not stored in the write destination address table 16a, the determination unit 14b determines that the data stored in the received packet is the data to be stored in the memory 6.

In a case where the determination unit 14b determines that the received data is the data to be stored in the cache memory, the DMA controller 204b performs the following processing. That is, the DMA controller 204b transmits the received data, as the data to be stored in the cache memory, to the processor core including the cache memory indicated by the write destination cache memory identification information acquired by the determination unit 14b. For example, in a case where the determination unit 14b determines that the received data is the data to be stored in the cache memory 5a, the DMA controller 204b transmits the received data to the processor core 4h.

On the other hand, in a case where the determination unit 14b determines that the data stored in the received packet is the data to be stored in the memory 6, the DMA controller 204b transmits the received data to the processor cores 4h to 4j as the data to be stored in the memory 6.

As illustrated in (A) of FIG. 22, the update unit 17a receives the memory address, which stores the data subjected to the polling processing, from the respective processor cores 4h to 4j. At the same time, the update unit 17a receives the write destination cache memory identification information indicating the respective cache memories 5a to 5c included in the respective processor cores 4h to 4j. In such a case, the update unit 17a stores the received data and the write destination cache memory identification information in the single memory line included in the write destination address table 16a. Also, as in the update unit 17, in a case where the memory address is received from the respective processor cores 4h to 4j together with the effect that the data subjected to the polling processing is stored in the cache memory, the update unit 17a performs the following processing. That is, the update unit 17a searches the line memory storing the received memory address from the write destination address table 16a, and updates the valid bit of the searched line memory to "0".

For example, in a case where the processor core 4h performs the polling processing, the information processing apparatus 2h including the above-described units performs the following processing. That is, the information processing apparatus 2h stores the memory address storing the data subjected to the polling processing and the write destination cache memory identification information indicating the cache memory 5a, in the write destination address table 16a in association with each other. Then, in a case where the packet is received from another information processing apparatus, including the information processing apparatus 2i, the information processing apparatus 2h determines whether or not the memory address storing the data stored in the received packet is stored in the write destination address table 16a.

At this time, in a case where the data stored in the received packet is the data subjected to the polling processing by the processor core 4h, the memory address storing the data of the received packet is stored in the write destination address table 16a. Therefore, the information processing apparatus 2h determines that the processor core performing the polling processing is the processor core 4h, from the write destination cache memory identification information indicating the cache memory 5a, which is stored in association with the memory address storing the received data. Then, the information processing apparatus 2h transmits the received data to the processor core 4h and stores the data in the cache memory 5a. The data that is written to the cache memory 5a is the aligned data.

[Effects of Example 5]

As described above, the information processing apparatus 2h stores the memory address, which stores the data subjected to the polling processing, and the write destination cache memory identification information, which indicates the cache memory, in the write destination address table 16a in association with each other. Then, the information processing apparatus 2 determines whether or not the memory address storing the data of the received packet is stored in the write destination address table 16a, and performs the following processing in a case where the memory address is stored in the write destination address table 16a. That is, the information processing apparatus 2h stores the received data in the cache memory indicated by the write destination cache memory identification information stored in association.

Therefore, in a case where the data subjected to the polling processing by the respective processor cores 4h to 4j is received, the information processing apparatus 2h can directly store the received data in the cache memories 5a to 5c. Therefore, even in a case where the processor included in each of the information processing apparatuses 2h and 2i is a multi-core processor including a plurality of processor cores, the parallel computer system 1d can efficiently perform the arithmetic processing.

Also, as in the information processing apparatuses 2 to 2g according to other examples, when the processor cores 4h to 4j receive data that is not used in the arithmetic operation, the information processing apparatus 2h prevents the discharge of the data stored in the cache memories 5a to 5c. As a result, the parallel computer system 1d can prevent the computation processing speed from being reduced.

Also, as in the information processing apparatus 2f, the information processing apparatus 2h holds the identity of the data stored in the cache memory 5a and the data stored in the memory 6, based on the identity information stored in the cache memory 5a. Therefore, the parallel computer system 1d can cause the respective information processing apparatuses 2h and 2i to perform appropriate processing.

Then, the padding addition unit 207 generates the padding-added data by adding the padding to the payload in a case where it is determined that the padding flag is valid, with reference to the padding information added to the received data. The DMA controller 204 writes the padding-added data to the cache memories 5a to 5c or the memory 6. Therefore, even when the received data is not aligned, it is possible to shorten a latency when the data is written to the cache memories 5a to 5c or the memory 6.

(C-6) Example 6

Figure 23:
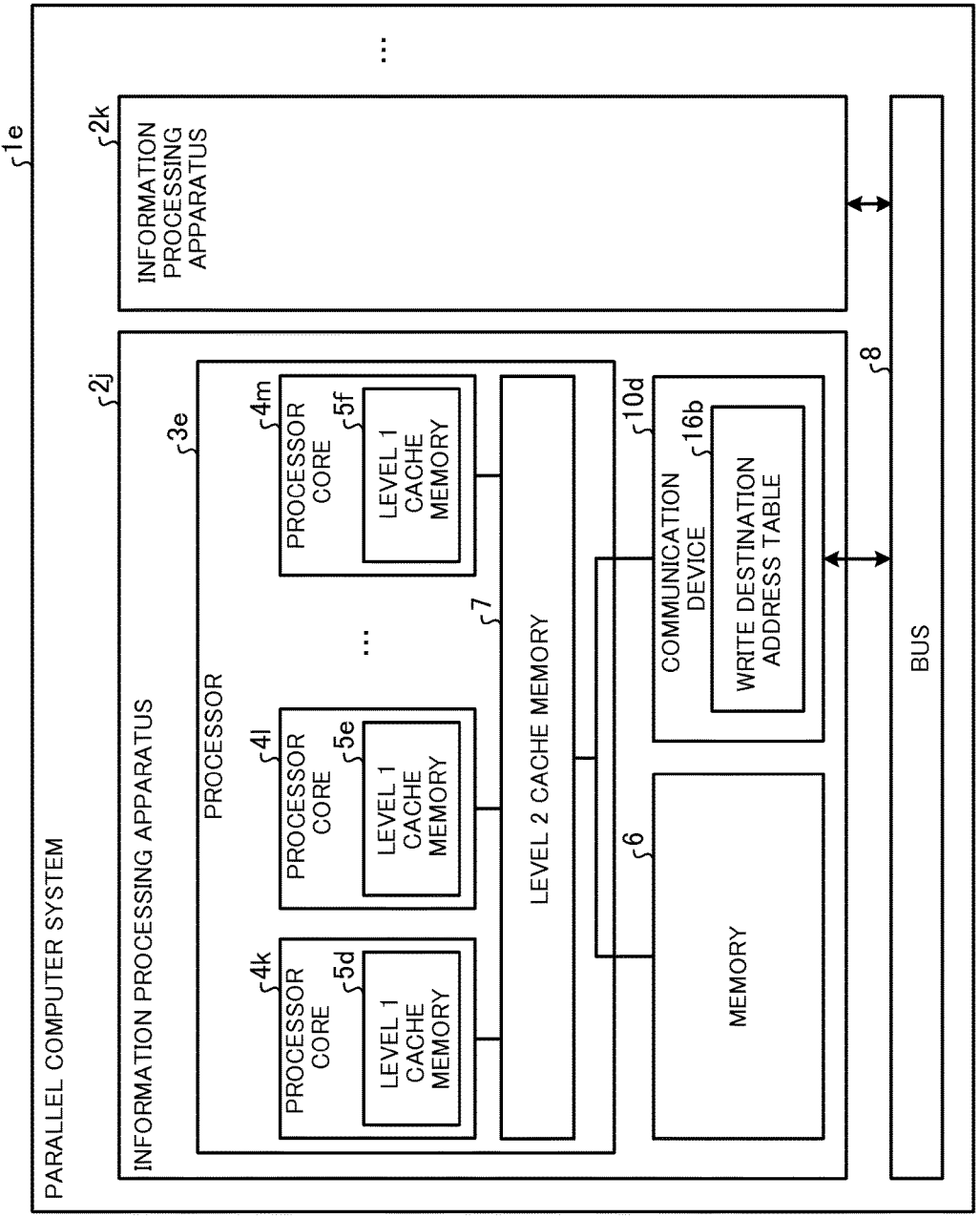
FIG. 23 is a diagram for describing a parallel computer system according to an example 6 of a third embodiment.

In an example 6 of the third embodiment, a parallel computer system including a plurality of information processing apparatuses each of which is provided with a processor which includes plurality of processor cores with their own L1 cache memories and a single L2 cache memory shared by the respective processor cores will be described. FIG. 23 is a diagram for describing the parallel computer system according to the example 6 of the third embodiment.

As illustrated in FIG. 23, the parallel computer system 1e includes a plurality of information processing apparatuses, including information processing apparatuses 2j and 2k. Since each information processing apparatus, including the information processing apparatus 2k, performs the same processing as the information processing apparatus 2j, a description thereof will be omitted.

Also, among the respective units included in the parallel computer system 1e, the units performing the same processing as the parallel computer system 1b are assigned with the same reference signs, and a description thereof will be omitted.

The information processing apparatus 2j includes a processor 3e with a plurality of processor cores 4k to 4m, and a level 2 cache memory 7 shared by the respective processor cores 4k to 4m. Also, the processor cores 4k to 4m include level 1 cache memories 5d to 5f, respectively. Since the processor cores 4l and 4m perform the same processing as the processor core 4k, a description thereof will be omitted.

As in the processor core 4h according to the example 5, in a case where the data received by the communication device 10d is received as the data to be stored in the level 1 cache memory 5d, the processor core 4k stores the received data in the level 1 cache memory 5d. Also, in a case where the data received by the communication device 10*d* is received as the data to be stored in the memory 6, the processor core 4*k* stores the received data in the memory 6.

Also, in a case where the data is stored in the level 1 cache memory 5*d* or the level 2 cache memory 7, the processor core 4*k* performs the same processing as the processor core 4*d* according to the example 3. That is, the processor core 4*k* holds the identity of the data stored in the level 1 cache memory 5*d*, the level 2 cache memory 7, and the memory 6, based on the first identity information and the second identity information.

Also, in a case where the polling processing is performed, the processor core 4*k* transmits, to the communication device 10*d*, the memory address storing the data subjected to the polling processing and the write destination cache memory identification information indicating the level 1 cache memory 5*d*. That is, the processor core 4*k* stores the memory address storing the data subjected to the polling processing and the write destination cache memory identification information indicating the level 1 cache memory 5*d*, in the write destination address table 16*b* in association with each other.

Also, in a case where the data subjected to the polling processing is stored in the level 1 cache memory 5*d*, the processor core 4*k* transmits, to the communication device 10*d*, the effect that the data is stored in the level 1 cache memory 5*d* and the memory address storing the data. That is, the processor core 4*k* deletes the memory address storing the data subjected to the polling processing, or the like, from the write destination address table 16*b*.

The communication device 10*d* includes the write destination address table 16*b*. As in the write destination address table 16*a*, the write destination address table 16*b* stores the following information in association. That is, the write destination address table 16*b* stores the memory address storing the data subjected to the polling processing and the write destination cache memory identification information identifying the respective level 1 cache memories 5*d* to 5*f* in association with each other.

As in the communication device 10*c*, in a case where the packet is received from another information processing apparatus, including the information processing apparatus 2*k*, the communication device 10*d* performs the following processing. That is, the communication device 10*d* determines whether or not the same memory address as the memory address storing the received packet is stored in the write destination address table 16*b*.

Then, in a case where the same memory address as the memory address storing the received packet is stored in the write destination address table 16*b*, the communication device 10*d* performs the following processing. That is, the communication device 10*d* determines a processor core including a level 1 cache memory indicated by the write destination cache memory identification information associated with the same memory address as the memory address storing the received packet. Then, the communication device 10*d* transmits the received data to the determined processor core as the data to be stored in the cache memory.

On the other hand, in a case where the same memory address as the memory address storing the received packet is not stored in the write destination address table 16*b*, the communication device 10*d* transmits the received data to the respective processor cores 4*k* to 4*m* as the data to be stored in the memory 6.

For example, in a case where the processor core 4*k* performs the polling processing, the information processing apparatus 2*j* including the above-described units performs the following processing. That is, the information processing apparatus 2*j* stores the memory address storing the data subjected to the polling processing and the write destination cache memory identification information indicating the level 1 cache memory 5*d*, in the write destination address table 16*b* in association with each other. Then, in a case where the packet is received from another information processing apparatus, including the information processing apparatus 2*k*, the information processing apparatus 2*j* determines whether or not the memory address storing the data stored in the received packet is stored in the write destination address table 16*b*.

At this time, in a case where the data stored in the received packet is the data subjected to the polling processing by the processor core 4*k*, the stored memory address is stored in the write destination address table 16*b*. Therefore, the information processing apparatus 2*j* determines that the processor core performing the polling processing is the processor core 4*k*, from the write destination cache memory identification information indicating the level 1 cache memory 5*d*, which is stored in association with the memory address storing the received data. Then, the information processing apparatus 2*j* transmits the received data to the processor core 4*k* and stores the data in the level 1 cache memory 5*d*.

Also, the information processing apparatus 2*j* performs the following processing by using the first identity information and the second identity information stored in the respective level 1 cache memories 5*d* to 5*f* and the level 2 cache memory 7. That is, the information processing apparatus 2*j* holds the identity of the data stored in the respective level 1 cache memories 5*d* to 5*f*, the level 2 cache memory 7, and the memory 6, and then, stores the received data in the respective level 1 cache memories 5*d* to 5*f* or the memory 6.

Also, even in the example 6 of the third embodiment, in the communication device 10*d*, in a case where "1 (valid)" is set as the padding flag in the padding information received through the determination unit 14, the padding addition unit 207 generates the padding-added data by adding the padding such that the data is aligned in the alignment size. The communication device 10*d* transmits the padding-added data to the processor cores 4*k* to 4*m* as the data to be held in the level 1 cache memories 5*d* to 5*f* or the memory 6.

Also, in a case where "0 (invalid)" is set as the padding flag in the padding information, the padding addition unit 207 transmits the data received by the packet reception unit 208 to the respective processor cores 4*k* to 4*m* as the data to be held in the level 1 cache memories 5*d* to 5*f* or the memory 6.

That is, the communication device 10*d* transmits the aligned data to the processor cores 4*k* to 4*m*.

[Effects of Example 6]

As described above, the information processing apparatus 2*j* stores the memory address storing the data subjected to the polling processing and the write destination cache memory identification information indicating the level 1 cache memory included in the processor core performing the polling processing in association with each other. Then, in a case where the memory address storing the received data is matched with the stored memory address, the information processing apparatus 2*j* stores the received data in the level 1 cache memory indicated by the write destination cache memory identification information stored in association. Therefore, the parallel computer system 1*e* can cause the respective processor cores 4*k* to 4*m* to perform efficient arithmetic processing.

Also, in a case where the data that is not subjected to polling processing is received, the information processing apparatus 2*j* can directly store the received data in the memory 6. Therefore, the parallel computer system 1*e* can perform efficient arithmetic processing, without reducing the computation processing speed.

Also, the information processing apparatus 2*j* performs the following processing by using the first identity information stored in the respective level 1 cache memories 5*d* to 5*f* and the second identity information stored in the level 2 cache memory 7. That is, the information processing apparatus 2*j* appropriately holds the identity of the data stored in the respective level 1 cache memories 5*d* to 5*f*, the level 2 cache memory 7, and the memory 6. As a result, the parallel computer system 1*e* can perform an appropriate arithmetic processing apparatus.

Then, the padding addition unit 207 generates the padding-added data by adding the padding to the payload in a case where it is determined that the padding flag is valid, with reference to the padding information added to the received data. The DMA controller 204 writes the padding-added data to the level 1 cache memories 5*d* to 5*f* or the memory 6. Therefore, even when the received data is not aligned, it is possible to shorten a latency when the data is written to the cache memory 5 or the memory 6.

(C-7) Example 7

The respective examples of the third embodiment have been described above, but the embodiments can be carried out in various different forms other than the above-described examples. Here, other examples included in the present invention as the example 7 of the third embodiment will be described below.

(1) Regarding Information Processing Apparatus Included in Parallel Computer System The above-described parallel computer systems 1 and 1*c* includes processor cores 4 and 4*g* with a cache memory 5, respectively. However, the embodiment is not limited. For example, each of the parallel computer systems 1 and 1*c* may include a processor which includes a processor core with a level 1 cache memory and a level 2 cache memory. The processor cores included in the parallel computer systems 1 and 1*c* may hold coherence of data by using first identity information stored in the level 1 cache memory and second identity information stored in the level 2 cache memory.

That is, the information processing apparatus determines whether or not the received data is the data subjected to the polling processing. In a case where it is determined that the received data is the data subjected to the polling processing, the information processing apparatus stores the received data in the cache memory. Also, in a case where it is determined that the received data is not the data subjected to polling processing, the information processing apparatus stores the received data in the memory. That is, the information processing apparatus can have any arbitrary configuration as long as the information processing apparatus performs such processing.

Even with respect to the data to be stored in the level 1 cache memory or the level 2 cache memory, in a case where the received data is not aligned, the padding addition unit 207 stores padding-added data generated by adding padding to the payload.

(2) Regarding Parallel Computer System

Each of the above-described parallel computer systems 1 to 1*e* may include a plurality of information processing apparatuses exhibiting the same function. However, the embodiment is not limited thereto. The parallel computer system may be a parallel computer system with an arbitrary information processing apparatus in each example. That is, the information processing apparatus determines whether or not the packet of the received packet is the data subjected to the polling processing, based on whether or not "1" is stored in the received packet as the control information, and determines whether or not the memory address is stored in the write destination address table. Then, in a case where any one condition is satisfied, the information processing apparatus may determine that the received data is the data subjected to the polling processing.

According to an embodiment, even in a case where the non-aligned data is received, a latency can be shortened.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing apparatus for being one of a plurality of information processing apparatuses included in a parallel computer system, the information processing apparatus comprising:
   a main storage device configured to store data;
   an arithmetic processing device including:
      a cache memory unit configured to store a part of the data stored in the main storage device; and
      an arithmetic processing unit configured to perform an arithmetic operation by using the data stored in the main storage device or the cache memory unit;
   a determination unit configured to determine whether data received from another information processing apparatus is data awaited by the arithmetic processing device;
   a data generation unit configured to generate padding-added data by adding padding to the data, based on adjustment information included in the received data; and
   a storage processing unit configured to store the padding-added data generated by the data generation unit in the main storage device or the cache memory unit, wherein
   the adjustment information has adjustment size information, and the data generation unit is configured to generate the padding-added data by adding padding matched with the adjustment size information to the data, and
   when the determination unit determines that the received data is the data awaited by the arithmetic processing device, the data generation unit is configured to generate the padding-added data and the storage processing unit is configured to store the padding-added data in the cache memory unit.

2. The information processing apparatus according to claim 1, wherein the adjustment information has necessity/non-necessity information indicating necessity or non-necessity of adjustment, and the data generation unit is configured to generate the padding-added data when the necessity/non-necessity information indicates the necessity of the adjustment.

3. An information processing apparatus one of a plurality of information processing apparatuses included in a parallel computer system, the information processing apparatus comprising:
  storage devices configured to store data;
  a determination unit configured to determine necessity or non-necessity of adjustment of received data, based on data size information and write destination address information of the received data and adjustment size information;
  a data generation unit configured to generate padding-added data by adding padding matched with the adjustment size information to the data, based on the data size information and the write destination address information of the received data and the adjustment size information, when the determination unit determines that the adjustment is necessary; and
  a storage processing unit configured to store the padding-added data generated by the data generation unit in the storage devices.

4. The information processing apparatus according to claim 3, further comprising an adjustment size information storage unit configured to store the adjustment size information,
  wherein the determination unit is configured to acquire the adjustment size information from the adjustment size information storage unit.

5. A parallel computer system including a plurality of information processing apparatuses, the parallel computer system comprising:
  a first information processing apparatus configured to transmit data having adjustment information; and
  a second information processing apparatus including:
    a main storage device configured to store data;
    an arithmetic processing device including:
      a cache memory unit configured to store a part of the data stored in the main storage device; and
      an arithmetic processing unit configured to perform an arithmetic operation by using the data stored in the main storage device or the cache memory unit;
    a determination unit configured to determine whether data received from another information processing apparatus is data awaited by the arithmetic processing device;
    a data generation unit configured to generate padding-added data by adding padding to the data, based on adjustment information included in the received data; and
    a storage processing unit configured to store the padding-added data generated by the data generation unit in the main storage device or the cache memory unit, wherein
    the adjustment information has adjustment size information, and the data generation unit is configured to generate the padding-added data by adding padding matched with the adjustment size information to the data, and
    when the determination unit determines that the received data is the data awaited by the arithmetic processing device, the data generation unit is configured to generate the padding-added data and the storage processing unit is configured to store the padding-added data in the cache memory unit.

6. The parallel computer system according to claim 5, wherein the adjustment information has necessity/non-necessity information indicating necessity or non-necessity of adjustment, and the data generation unit is configured to generate the padding-added data when the necessity/non-necessity information indicates the necessity of the adjustment.

7. A parallel computer system comprising:
  a plurality of information processing apparatuses, each of the information processing apparatuses including:
    storage devices configured to store data;
    a determination unit configured to determine necessity or non-necessity of adjustment of received data, based on data size information and write destination address information of the received data and adjustment size information;
    a data generation unit configured to generate padding-added data by adding padding matched with the adjustment size information to the data, based on the data size information and the write destination address information of the received data and the adjustment size information, when the determination unit determines that the adjustment is necessary; and
    a storage processing unit configured to store the padding-added data generated by the data generation unit in the storage devices.

8. The parallel computer system according to claim 7, wherein the information processing apparatus further includes an adjustment size information storage unit configured to store the adjustment size information, and the determination unit is configured to acquire the adjustment size information from the adjustment size information storage unit.

9. A control method for controlling a first information processing apparatus, which constitutes a parallel computer system including a plurality of information processing apparatuses, the control method comprising:
  transmitting data including adjustment information;
  determining whether data received from a second information processing apparatus is data awaited by an arithmetic processing unit included in the first information processing apparatus;
  generating, when the received data is the data awaited by the arithmetic processing unit, padding-added data by adding padding to the data, based on the adjustment information included in the received data; and
  storing the generated padding-added data in a cache memory unit included in the arithmetic processing unit, wherein
  the adjustment information has adjustment size information, and the padding-added data is generated by adding padding matched with the adjustment size information to the data.

10. The control method according to claim 9, wherein the adjustment information has necessity/non-necessity information indicating necessity or non-necessity of adjustment, and the padding-added data is generated when the necessity/non-necessity information indicates the necessity of the adjustment.

11. A control method for controlling an information processing apparatus, which constitutes a parallel computer system including a plurality of information processing apparatuses, the control method comprising:
  determining necessity or non-necessity of adjustment of received data, based on data size information and write destination address information of the received data and adjustment size information;
  generating padding-added data by adding padding matched with the adjustment size information to the data, based on the data size information and the write destination address information of the received data and the adjustment size information, when it is determined that the adjustment is necessary; and storing the generated padding-added data in storage devices.

12. The control method according to claim 11, wherein the adjustment size information is acquired from an adjustment size information storage unit that stores the adjustment size information.

* * * * *